(12) United States Patent
Kreishan

(10) Patent No.: US 11,418,943 B2
(45) Date of Patent: Aug. 16, 2022

(54) WIRELESS SYSTEM AND DEVICE COMMUNICATION MANAGEMENT

(71) Applicant: Loay O. Kreishan, Aurora, CO (US)

(72) Inventor: Loay O. Kreishan, Aurora, CO (US)

(73) Assignee: Charter Communications Operating, LLC, St. Louis, MO (US)

(\*) Notice: Subject to any disclaimer, the term of this patent is extended or adjusted under 35 U.S.C. 154(b) by 622 days.

(21) Appl. No.: 16/366,741

(22) Filed: Mar. 27, 2019

(65) Prior Publication Data
US 2020/0314629 A1    Oct. 1, 2020

(51) Int. Cl.
| | |
|---|---|
| H04W 8/18 | (2009.01) |
| H04W 24/08 | (2009.01) |
| H04W 64/00 | (2009.01) |
| H04W 76/16 | (2018.01) |
| H04W 36/08 | (2009.01) |
| H04W 48/18 | (2009.01) |
| H04W 88/06 | (2009.01) |

(52) U.S. Cl.
CPC .......... *H04W 8/183* (2013.01); *H04W 24/08* (2013.01); *H04W 64/003* (2013.01); *H04W 76/16* (2018.02)

(58) Field of Classification Search
CPC ... H04W 8/183; H04W 24/08; H04W 64/003; H04W 76/16
See application file for complete search history.

(56) References Cited

U.S. PATENT DOCUMENTS

| | | | |
|---|---|---|---|
| 10,231,117 B2 | 3/2019 | Sahu et al. | |
| 2013/0329639 A1 | 12/2013 | Wietfeldt et al. | |
| 2014/0043966 A1* | 2/2014 | Lee | H04W 28/08 370/230 |
| 2015/0245309 A1* | 8/2015 | Nayak | H04W 8/183 455/435.3 |
| 2016/0126996 A1* | 5/2016 | Jeong | H04B 1/3816 455/558 |
| 2017/0048773 A1* | 2/2017 | Miao | H04W 36/14 |
| 2017/0156050 A1 | 6/2017 | Khairmode et al. | |
| 2018/0014239 A1* | 1/2018 | Chau | H04W 88/06 |

FOREIGN PATENT DOCUMENTS

| | | |
|---|---|---|
| WO | 2015180134 A1 | 12/2015 |
| WO | 2017197295 A1 | 11/2017 |

\* cited by examiner

*Primary Examiner* — Jay L Vogel
(74) *Attorney, Agent, or Firm* — Armis IP Law, LLC

(57) ABSTRACT

According to one configuration, a system comprising: a first SIM (Subscriber Identity Module) device; a second SIM device; and user equipment in which the first SIM device and the second SIM device are installed. The user equipment is operable to: access first subscriber identity information stored in the first SIM device, the first subscriber identity information providing the user equipment access to a first wireless network in a network environment; access second subscriber identity information stored in the second SIM device, the second subscriber identity information providing the user equipment access to a second wireless network in the network environment; and via analysis of configuration settings in the second subscriber identity information, detect that the second network is assigned to support non-voice wireless communications between the user equipment and a remote network.

44 Claims, 12 Drawing Sheets

WIRELESS SYSTEM AND DEVICE COMMUNICATION MANAGEMENT

BACKGROUND

Conventional wireless networks can be configured to include macro (large) cell and small cell resources to support both voice and data services to user equipment using a single subscription (e.g., one SIM profile). In certain instances, a macro radio layer is normally used to minimize signaling due to inter-cell handover as respective user equipment moves between cells.

BRIEF DESCRIPTION OF EMBODIMENTS

This disclosure includes the observation that there are deficiencies associated with conventional techniques of supporting wireless communications using standard SIM devices. For example, prior conventional implementations of dual SIM dual Standby (DSDS) do not support offloading because of the following:

- Current implementations of Dual Subscriber Identity Module (SIM) Dual Standby (DSDS) depend on the subscriber manually selecting a network designated primary for voice and data usage. The subscriber also manually designates which network is secondary for data and voice usage.
- The subscriber must select and designate the primary network for voice and secondary networks via manual input to a graphical user interface of a respective mobile communication device.
- There is no dynamic network switching between networks. If the user desires to switch between primary and secondary networks, the user must go to the graphical user interface (UI) and manually assign a role to each network.
- In some cases, depending on the operating system and modem chipset in the device, assigning a network role or changing the assignment will cause the device to disconnect from the existing network and reconnect to the new desired network. This causes network interruption.
- Devices supporting DSDS make use of either two physical SIMs or one physical SIM and one embedded SIM (eSIM) or two embedded SIMs.
- Functionality in existing DSDS assumes that both networks' coverage overlap with each other, eliminating the need to have geo fencing to optimize UE or handset resources.
- The device has to display both networks' name indicators, phone numbers, and signal strength. There is no option in conventional techniques for a respective carrier to mask the offload network.
- Application on the phone can use both phone numbers and access device information for both SIMs.

Embodiments herein include novel ways of providing improved wireless communications in a network environment.

For example, embodiments herein enable: i) mobile service providers to offload data traffic on to available cost-effective networks, ii) MVNO (Mobile Virtual Network Operator) and wireless service providers to offload data traffic from the MNO (Mobile Network Operator) network for cost efficient roaming, iii) an offload mode that enhances user experience and provides high bandwidth data service; the offload mode enhances user experience for offloading networks, iv) appearance of a single network to user equipment in which the user doesn't have to be concerned with network selection and corresponding wireless coverage, v) via the offload mode as described herein, the carrier (service provider) can select the policy for which network is used for offloading data and which network is used for voice, and vi) the offload mode as described herein preserves a user device's battery and power usage by limiting unwanted scanning, displays of information, and unwanted alternating between networks, and so on.

More specifically, in accordance with further embodiments herein, user equipment (such as a mobile communication device) includes a first SIM device (such as installed in a first slot of the user equipment) and a second SIM device (such as installed in a second slot of the user equipment).

The first SIM device stores first subscriber identity information assigned to the user equipment and corresponding user; the second SIM device stores second subscriber identity information assigned to the user equipment and corresponding user. A communication manager (such as executed by an operating system) of the user equipment accesses the first subscriber identity information to provide the user equipment access to a first wireless network in a network environment; the communication manager of the user equipment accesses the second subscriber identity information to provide the user equipment access to a second wireless network in the network environment. Via analysis of configuration settings (such as service provider or carrier profile information specifying OFFLOAD mode setting information) in the second subscriber identity information, the user equipment detects that the second network is assigned to support non-voice data wireless communications between the user equipment and a remote network.

In one embodiment, the configuration settings of the second subscriber identity information include a carrier (service provider) profile of a corresponding service provider providing wireless connectivity via the second wireless network.

In accordance with still further embodiments, the configuration settings (in the second SIM device) indicating assignment of supporting the non-voice wireless communications are pre-programmed in the second SIM device prior to the second SIM device being inserted into the second slot of the user equipment. In one embodiment, the communication manager of the user equipment is operable to access the pre-programmed configuration settings of the second subscriber identity information as an alternative to a user of the user equipment having to provide input specifying which of the first SIM device and the second SIM device present in the user equipment is to provide wireless service for the non-voice data communications.

In still further embodiments, the first wireless network (such as including large cells) and corresponding first subscriber identity information is assigned to support voice communications between the user equipment and the remote network. The second subscriber identity information supports offload of user equipment from a large cell region of wireless coverage to different small cell regions of wireless coverage depending on availability of same. If offload to a secondary wireless network is not possible, the first subscriber identity information (and corresponding first SIM device) provides respective user voice data wireless services and non-voice data wireless services.

In accordance with further embodiments, the user equipment is required to establish a first wireless communication link with the first wireless network that supports the voice communications prior to establishing a second wireless communication link supporting offloading of the non-voice wireless communications to the second wireless network.

In yet further embodiments, in accordance with the first subscriber identity information, the user equipment establishes a first wireless communication link between the user equipment and the first wireless network; the established first wireless communication link supports voice communications associated with the user equipment. The user equipment further communicates non-voice data over the established first wireless communication link in accordance with the first subscriber identity information in response to detecting that the second wireless network is unavailable. In response to detecting subsequent availability of the second wireless network at a current location where the user equipment resides, the user equipment establishes a second wireless communication link extending between the user equipment and the second wireless network. Via the offload mode, the user equipment then communicates the non-voice data over the established second wireless communication link with the second wireless network.

In accordance with yet further embodiments, based on analysis of both the first subscriber identity information and the second subscriber identity information, the communication manager of the user equipment verifies that at least one set of the subscriber identity information such as the first subscriber identity information or second subscriber identity information supports voice communications between the user equipment and the first wireless network prior to establishing a wireless communication link between the user equipment and the second wireless network that communicates the non-voice wireless communications over the second wireless communication link using the subscriber identity information. This prevents a user from installing multiple SIM devices that only support the OFFLOAD capability as described herein. In other words, the operating system of the user equipment can be configured to verify that at least one of the SIM devices and corresponding subscriber identity information installed on the mobile communication device supports voice communications prior to providing non-voice data communications via the OFFLOAD mode.

In accordance with further embodiments, the user equipment includes a MODEM device operable to process received wireless communications from the first wireless network and the second wireless network. In one embodiment, the user equipment switches between: i) receiving first communications at a modem device from the first wireless network, and ii) receiving second communications at the modem device from the second wireless network. The user equipment (at least occasionally or, alternatively, such as per 3GPP technical specification the network provides a time interval where the UE wakes up or tunes in to listen for paging targeted for the user equipment) processes the first communications (such as looking for so-called page requests or call alerts) from the first wireless network to determine whether a remote device (remote caller) is attempting to establish a voice call with the user equipment. In one embodiment, for a majority of the time, when no call is made by the user, the user equipment uses the modem device to process non-voice data communications received over the second wireless network.

In accordance with further embodiments, in response to detecting occurrence of a remote device (such as a phone device) attempting to establish the voice call with the user equipment, and acceptance of the voice call by a user of the user equipment, the user equipment controls operation of the modem device to support communications between the user equipment and the remote device over the first wireless network in accordance with the first subscriber identity information. In one embodiment, the user equipment can be configured to maintain the wireless registration with the second wireless network as being active although no non-voice communications may be received during the voice call as the modem can be configured to switchover to processing the voice communications associated with the voice call for its duration and then switch back to receiving non-voice communications from the second wireless network after termination of the voice call. Alternatively, in one embodiment, for voice communications, the modem can be configured to switch to receiving data from the voice network (first network). The modem will use the voice network for voice and data services during the voice session.

Thus, embodiments herein include maintaining a second communication link between the user equipment and the second wireless network as being active while the user equipment receives voice communications and the non-voice wireless communications over a first communication link from the first wireless network. As mentioned, the user equipment can be configured to switch to receiving the non-voice communications from the second wireless network in response to termination of receiving the voice communications from the first wireless network.

In yet further embodiments, the user equipment switches from receiving the non-voice wireless communications from the first wireless network and the second wireless network depending on availability of the second wireless network. In one embodiment, the second wireless network is a default or preferred network assigned a higher priority to receive non-voice communications than the first wireless network over which to operate in the OFFLOAD mode and receive the non-voice wireless communications.

In accordance with still further embodiments, embodiments herein include switching from receiving the non-voice wireless communications from the first wireless network and the second wireless network depending on a location of the user equipment in a region of wireless coverage provided by the first wireless network. For example, if a second wireless network is available while the user equipment is in the region of wireless coverage provided by the first wireless network, then the user equipment enters the OFFLOAD mode to support the non-voice data communications between the user equipment and the remote network.

In yet further embodiments, based on analysis of the first subscriber identity information and the second subscriber identity information, the user equipment: i) designates the first wireless network as a default to support voice wireless communications, and ii) designates the second wireless network as a default to support the non-voice wireless communications. The second wireless network provides multiple (smaller sized) regions of wireless coverage (than region of wireless coverage in the first wireless network) to support the non-voice wireless communications within a single region of wireless coverage provided by the first wireless network.

The user equipment can be configured to enter the OFFLOAD mode in a suitable manner. For example, in one embodiment, the user equipment communicates from the user equipment to a wireless station in the first wireless network to retrieve network parameters that can be used to determine availability information associated with the second wireless network. Via the network availability information, the user equipment determines availability of a wireless station in the second wireless network that supports the non-voice wireless communications.

More specifically, in one embodiment, the user equipment retrieves network availability information such as from a wireless station (or other suitable resource) in the first wireless network. The user equipment also receives location information indicating a current location of the user equipment in a region of wireless coverage provided by the wireless station in the first wireless network. Via the network availability information and current location information, the user equipment maps the current location of the user equipment to a wireless station in the second wireless network. The user equipment then establishes a wireless communication link with the wireless station in the second wireless network in accordance with the second subscriber identity information. Via the established wireless communication link with the wireless station in the second wireless network, the user equipment communicates the non-voice wireless communications between the user equipment and the remote network.

Mapping of the current location of the user equipment to the wireless station in the second wireless network can be achieved in any suitable manner. In one embodiment, the mapping of the current location of the user equipment to the wireless station in the second wireless network includes: via the network availability information received from the wireless station in the first wireless network, identifying a region of wireless coverage provided by the wireless station in the second wireless network. The user equipment establishes the wireless communication link with the wireless station in the second wireless network in response to detecting that the current location resides within the region of wireless coverage provided by the wireless station in the second wireless network.

In the event that the current location of the user equipment is unknown, the user equipment can be configured to monitor wireless communications in a region of wireless coverage provided by a wireless station in the first wireless network. In response to detecting presence of the wireless station in the second wireless network via the monitored wireless communications, the user equipment establishes a wireless communication link with the wireless station in the second wireless network. Via the established wireless communication link with the wireless station in the second wireless network, the user equipment communicates the non-voice wireless communications between the user equipment and the remote network.

In accordance with further embodiments, in response to detecting presence of the wireless station in the second wireless network, the user equipment can be configured to update the network availability information to indicate the wireless station and its availability in the region of wireless coverage provided by the wireless station in the first wireless network. The user equipment then provides notification of the availability of the detected wireless station in the second wireless network to a central authority (such as a server resource) tracking locations of wireless stations associated with the second wireless network. Thus, the user equipment can be configured to provide the server resource notification of a new wireless station in the second network in order to update the current network availability information.

Note that further embodiments herein include:
Providing an offload function (via a uniquely configured supplemental SIM device) to switch data seamlessly between networks with preference to the designated network if/when coverage is available.
A service provider (wireless Carrier) profile in a SIM device that will include flags or indicators that the device's operating system will use to determine if the carrier profile will be used for offloading function or as a standard carrier service profile used in standard DSDS.
The offload flags or indicators in the corresponding configuration settings of a SIM device can be included in the Profile Policy Rules (PPR) or by specific flag in the carrier profile.
If the wireless carrier (service provider) profile and corresponding SIM device is used for data offloading, the device (user equipment) will be in OFFLOAD mode for the specific network.
In the offload mode, the device will utilize the offload network for data services; in offload mode, if required by carrier and based on configuration, the device does not render any signs or indicators for the offloading network. The network UI (User Interface) and information is not visible to the subscriber and the subscriber's applications for the offload network. This includes preventing display of a UI (on the user equipment) for selecting designated networks, network names, phone number (MSISDN) and signal strength indicators.
If using offload mode in DSDS (Dual SIM Dual Standby), the offload network will be designated for data service only network by default; the device will have a single offloading network active, and by default, it will be the designated non-voice data service network. The other network will be designated for voice and non-voice data.
This solution takes into consideration the possibility of limited network coverage whereby the offload network and the voice network may not overlap. System will use any available network for data. In this case, both wireless networks can be used for data.
This solution can switch on/off scanning for designated offload networks based on both network availability and networks' metrics. If these metrics are not met, the offload network will not be used.
Switching between available networks and designated networks can be invoked by the device modem, OS or over-the-top application through application program interface (API).
Both networks will have active internet PDN. Switching the data path or route dynamically between networks will designate an active and standby PDN.

Embodiments herein are useful over conventional techniques. For example, as further discussed herein, user equipment enters an OFFLOAD mode to offload data traffic from a first service provider network (such as large cell region of wireless coverage) to a second service provider network (such as a small cell region of wireless coverage, which is a more cost effective network); offloading as described herein preserves user experience and provides seamless data service across different networks; via programming of a SIM device or other configuration settings, a respective service provider can select the policy for which network is used for offloading data and which network is used for voice; the OFFLOAD mode and unique manner in which to identify presence of a network can be implemented to preserve battery and power usage on the device by limiting both unwanted scanning and needless alternating between wireless networks; further embodiments herein can include implementation of the OFFLOAD mode to offload user equipment to a partner's wireless network without user intervention.

Note that any of the resources as discussed herein can include one or more computerized devices, user equipment, wireless communication devices, gateway resources, mobile communication devices, sensors, servers, base stations, wireless communication equipment, communication management systems, controllers, workstations, user equipment, handheld or laptop computers, or the like to carry out and/or support any or all of the method operations disclosed herein. In other words, one or more computerized devices or processors can be programmed and/or configured to operate as explained herein to carry out the different embodiments as described herein.

Yet other embodiments herein include software programs to perform the steps and/or operations summarized above and disclosed in detail below. One such embodiment comprises a computer program product including a non-transitory computer-readable storage medium (i.e., any computer readable hardware storage medium) on which software instructions are encoded for subsequent execution. The instructions, when executed in a computerized device (hardware) having a processor, program and/or cause the processor (hardware) to perform the operations disclosed herein. Such arrangements are typically provided as software, code, instructions, and/or other data (e.g., data structures) arranged or encoded on a non-transitory computer readable storage medium such as an optical medium (e.g., CD-ROM), floppy disk, hard disk, memory stick, memory device, etc., or other a medium such as firmware in one or more ROM, RAM, PROM, etc., or as an Application Specific Integrated Circuit (ASIC), etc. The software or firmware or other such configurations can be installed onto a computerized device to cause the computerized device to perform the techniques explained herein.

Accordingly, embodiments herein are directed to a method, system, computer program product, etc., that supports operations as discussed herein.

One embodiment includes a computer readable storage medium and/or system having instructions stored thereon to support wireless communications using multiple SIM devices and corresponding subscriber identity information according to embodiments herein. The instructions, when executed by the computer processor hardware, cause the computer processor hardware (such as one or more co-located or disparately processor devices or hardware) to: access first subscriber identity information assigned to user equipment, the first subscriber identity information providing the user equipment access to a first wireless network in a network environment; access second subscriber identity information assigned to the user equipment, the second subscriber identity information providing the user equipment access to a second wireless network in the network environment; and via analysis of configuration settings in the second subscriber identity information, detect that the second network is assigned to support non-voice wireless communications between the user equipment and a remote network.

The ordering of the steps above has been added for clarity sake. Note that any of the processing steps as discussed herein can be performed in any suitable order.

Other embodiments of the present disclosure include software programs and/or respective hardware to perform any of the method embodiment steps and operations summarized above and disclosed in detail below.

It is to be understood that the system, method, apparatus, instructions on computer readable storage media, etc., as discussed herein also can be embodied strictly as a software program, firmware, as a hybrid of software, hardware and/or firmware, or as hardware alone such as within a processor (hardware or software), or within an operating system or a within a software application.

As discussed herein, techniques herein are well suited for use in the field of conveying wireless communications in wireless network environment. However, it should be noted that embodiments herein are not limited to use in such applications and that the techniques discussed herein are well suited for other applications as well.

Additionally, note that although each of the different features, techniques, configurations, etc., herein may be discussed in different places of this disclosure, it is intended, where suitable, that each of the concepts can optionally be executed independently of each other or in combination with each other. Accordingly, the one or more present inventions as described herein can be embodied and viewed in many different ways.

Also, note that this preliminary discussion of embodiments herein (BRIEF DESCRIPTION OF EMBODIMENTS) purposefully does not specify every embodiment and/or incrementally novel aspect of the present disclosure or claimed invention(s). Instead, this brief description only presents general embodiments and corresponding points of novelty over conventional techniques. For additional details and/or possible perspectives (permutations) of the invention(s), the reader is directed to the Detailed Description section (which is a summary of embodiments) and corresponding figures of the present disclosure as further discussed below.

Figure 1:
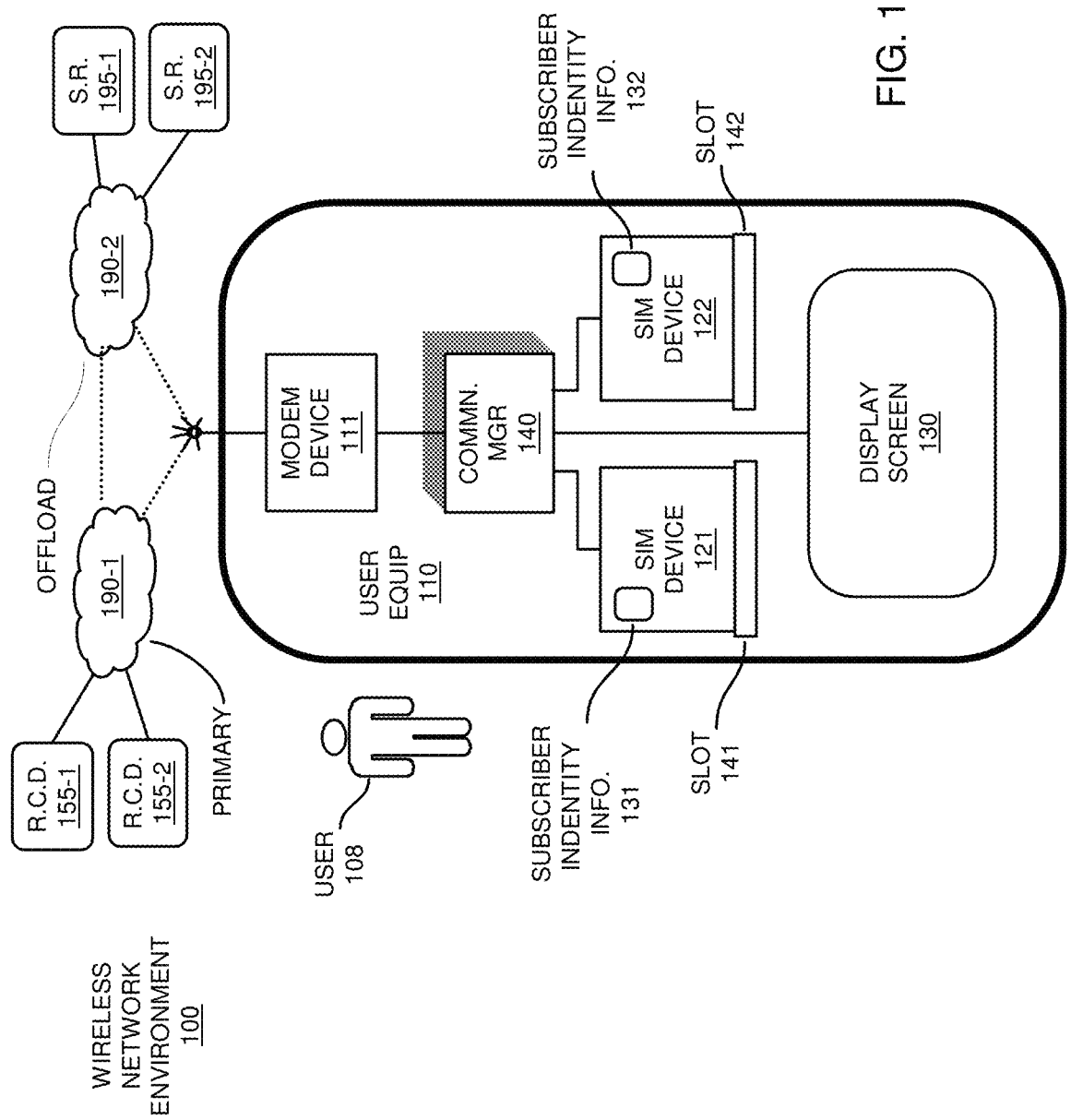
FIG. 1 is an example diagram illustrating user equipment supporting use of multiple SIM devices according to embodiments herein.

The foregoing and other objects, features, and advantages of the invention will be apparent from the following more particular description of preferred embodiments herein, as illustrated in the accompanying drawings in which like reference characters refer to the same parts throughout the different views. The drawings are not necessarily to scale, with emphasis instead being placed upon illustrating the embodiments, principles, concepts, etc.

DETAILED DESCRIPTION

In accordance with general embodiments herein, user equipment includes: a first SIM (Subscriber Identity Module) device and a second SIM device. A communication manager of the user equipment is operable to access first subscriber identity information stored in the first SIM device, the first subscriber identity information providing the user equipment access to a first wireless network in a network environment. The communication manager of the user equipment is further operable to access second subscriber identity information stored in the second SIM device, the second subscriber identity information providing the user equipment access to a second wireless network in the network environment. Via analysis of the configuration settings in the second subscriber identity information, the communication manager of the user equipment detects that the second network is assigned to support non-voice wireless communications between the user equipment and a remote network.

Now, more specifically, FIG. 1 is an example diagram illustrating a wireless communication system according to embodiments herein.

As shown in this example embodiment, the network environment 100 includes user equipment 110, network 190-1, and network 190-2.

User equipment 110 includes modem device 111, communication manager 140, SIM device 121, SIM device 122, and display screen 130.

In this example embodiment, SIM device 121 inserted in slot 141 stores corresponding subscriber identity information 131; SIM device 122 inserted in slot 142 stores corresponding subscriber identity information 132.

Note that each of the different components (such as modem device 111, communication manager 140, etc.) in network environment 100 can be implemented via hardware, software, or a combination of both hardware and software. More specifically, communication manager 140 can be configured to include communication manager hardware and/or communication manager software to carry out embodiments as discussed herein; and so on.

As further shown, user 108 operates corresponding user equipment 110.

As further discussed herein, user equipment 110 communicates over network 190-1 with one or more remote communication devices 155-1, 155-2, etc. (such as mobile phone devices supporting voice communications); user equipment 110 communicates over network 190-1 or network 190-2 with one or more server resources 195-1, 195-2, etc. (such as providing webpage information, email information, etc., to the user equipment 110).

In one embodiment, the first SIM device 121 stores first subscriber identity information 131 assigned to the user equipment 110 and corresponding user 108; the second SIM device 122 stores second subscriber identity information 132 assigned to the user equipment 110 and corresponding user 108.

Communication manager 140 (such as executed by an operating system) of the user equipment 110 accesses the first subscriber identity information 131 to provide the user equipment 110 access to a first wireless network 190-1 (network N1) in network environment 100; the communication manager 140 of the user equipment 110 accesses the second subscriber identity information 132 to provide the user equipment 110 access to a second wireless network 190-2 (network N2) in the network environment 100. Via analysis of respective configuration settings (such as service provider or carrier profile information specifying OFF-LOAD mode setting information) in the second subscriber identity information 132, the user equipment 110 detects that the second network 190-2 is assigned to support non-voice data wireless communications between the user equipment 110 and a remote network and corresponding resources such as server resources 195-1, 195-2, etc.

Figure 2:
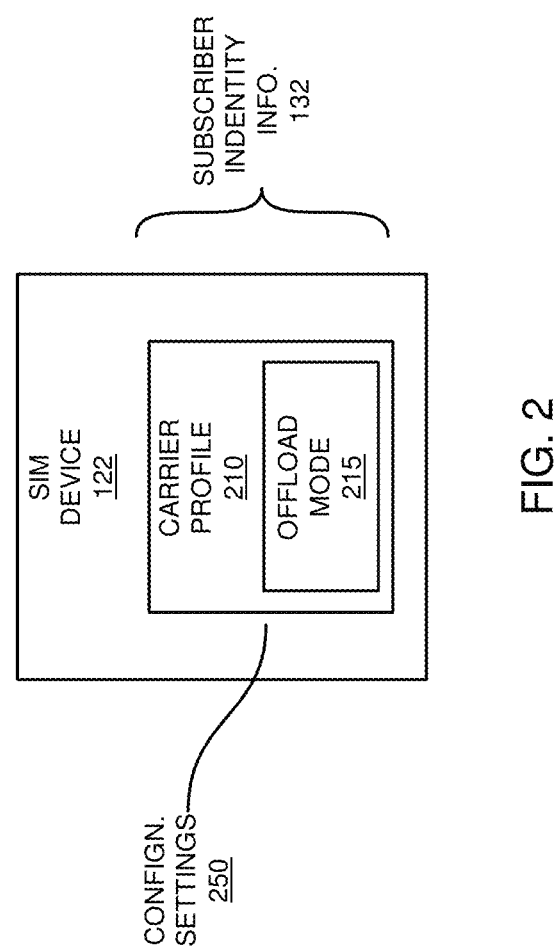
FIG. 2 is an example diagram illustrating a SIM device and corresponding subscriber identity information (configuration settings) according to embodiments herein.

FIG. 2 is an example diagram illustrating a SIM device and corresponding subscriber identity information (such as including configuration settings) according to embodiments herein.

In one embodiment, the configuration settings 250 stored in the second subscriber identity information 132 include a carrier profile 210 associated with a particular service provider providing wireless connectivity via the second wireless network 190-2 to the user equipment 110.

In accordance with still further embodiments, the configuration settings 250 indicate the assignment of the SIM device 122 and corresponding subscriber identity information 132 to support data communications (such as non-voice wireless communications) In one embodiment, the SIM device 122 is pre-programmed with the subscriber identity information 132 (carrier profile 210, configuration settings 250, etc.) prior to the second SIM device being inserted into the second slot 142 of the user equipment 110. This alleviates the user 108 from having to manually input settings information to assign the subscriber identity information 132 to the second wireless network 190-2, which may be difficult or cumbersome.

During operation, the communication manager 140 of the user equipment 110 is operable to access the pre-programmed configuration settings 250 of the second subscriber identity information 132 as an alternative to a user of the user equipment providing input specifying which of the first SIM device 121 and the second SIM device 122 present in the user equipment 110 is to provide wireless service for the non-voice data communications. For example, to determine to which of multiple networks the subscriber identity information 132 pertains, the communication manager 140 accesses the configuration settings 250 associated with carrier profile 210 to detect that the SIM device 122 (and corresponding network N2) has been assigned to support non-voice communications associated with the user equipment 110.

Based on analysis of the first subscriber identity information 131 and the second subscriber identity information 132, the communication manager 140 of user equipment 110: i) designates the first wireless network 190-1 as a default to support voice (telephone) wireless communications, and ii) designates the second wireless network 190-2 as a default to support the non-voice wireless communications. As further discussed herein, the second wireless network 190-2 provides multiple (smaller sized) regions of wireless coverage (than region of wireless coverage in the first wireless network) to support the non-voice wireless communications within a single region of wireless coverage provided by the first wireless network.

Note that, in one embodiment, the user equipment 110 is required to establish a first wireless communication link with the first wireless network (associated with subscriber identity information 131) that supports the voice communications prior to establishing a second wireless communication link supporting offloading of the non-voice wireless communications to the second wireless network (associated with subscriber identity information 132). This ensures that that user 108 and user equipment 108 camps on a respective network (such as network 190-1 or N1) and is able to establish voice calls with one or more remote communication devices (such as remote communication device 155-1, 155-2, etc.) in network 190-1.

As further discussed herein, as previously discussed, the first wireless network 190-1 and corresponding first subscriber identity information 131 is assigned to support voice communications between the user equipment 110 and the remote network 190-1. The second subscriber identity information 132 supports offload (via an OFFLOAD mode) of user equipment 110 from a large cell region of wireless coverage (such as by a single wireless base station) to one or more different small cell regions of wireless coverage depending on availability of the small cell regions of wireless coverage in large cell regions of wireless coverage.

If offload (switchover) to a respective cell in the secondary wireless network 190-2 is not possible, the first subscriber identity information 131 (and corresponding first SIM device 121) provides respective user 108 voice data wireless services as well as non-voice data wireless services. In one example embodiment, it is desirable to switchover to receiving non-voice communications (data communications such as to retrieve webpages, video content, etc.) to the network 190-2 such that the network 190-2 is used as much as possible to receive non-voice data communications.

In yet further embodiments, in accordance with the first subscriber identity information 131, the communication manager 140 of the user equipment 110 establishes a first wireless communication link between the user equipment and the first wireless network; the established first wireless communication link supports voice communications associated with the user equipment 110. The user equipment 110 further communicates non-voice data over the established first wireless communication link in accordance with the first subscriber identity information 131 in response to detecting that the second wireless network 190-2 is unavailable. In response to detecting subsequent availability of the second wireless network 190-2 at a current location where the user equipment 110 and corresponding user 108 reside, the communication manager 140 of the user equipment 110 establishes a second wireless communication link extending between the user equipment and the second wireless network. Via the offload mode as indicated by the subscriber identity information 132 and the second wireless communication link, the user equipment 110 then communicates the non-voice data over the established second wireless communication link with the second wireless network.

In accordance with further embodiments, in response to detecting occurrence of a remote device 155-1 (such as a phone device) attempting to establish the voice call with the user equipment 110, and acceptance of the voice call by a user 108 of the user equipment 110, the user equipment 110 controls operation of the modem device 111 to support communications (associated with the user accepted incoming phone call) between the user equipment 110 and the remote device 155-1 over the first wireless network 190-1 in accordance with the first subscriber identity information 131. In one embodiment, the user equipment 110 maintains the wireless communication link with the second wireless network 190-2 as being active although no non-voice communications may be received during the voice call as the modem device 111 can be configured to switchover to processing the voice communications associated with the voice call for duration of same.

Thus, embodiments herein can include maintaining a second communication link between the user equipment 110 and the second wireless network 190-2 as being active while the user equipment receives voice communications and the non-voice wireless communications over a first communication link from the first wireless network 190-1. The user equipment 110 switches to receiving the non-voice communications from the second wireless network 190-2 in response to termination of receiving the voice communications from the first wireless network 190-1.

Figure 3:
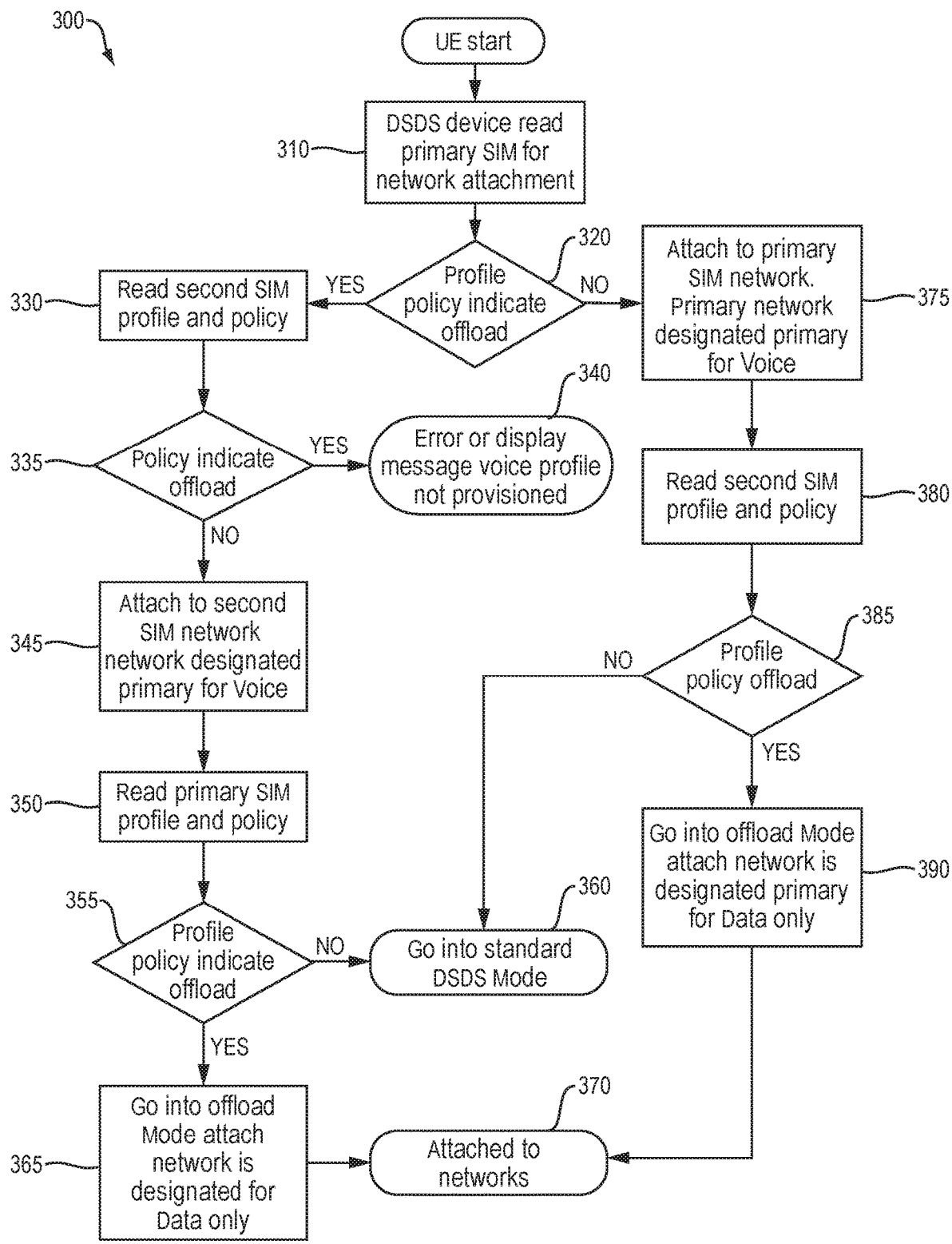
FIG. 3 is an example diagram illustrating a flowchart of detecting presence of one or more sets of subscriber identity information according to embodiments herein.

FIG. 3 is an example diagram illustrating a flowchart of detecting presence of one or more sets of subscriber identity information according to embodiments herein.

In accordance with yet further embodiments, based on analysis of both the first subscriber identity information of a first SIM device (such as installed in a first slot 141 of the user equipment 110) and second subscriber identity information of a second SIM device (such as in a second slot 142 of user equipment 110), the communication manager 140 of the user equipment 110 verifies that at least one set of the subscriber identity information such as the first subscriber identity information of the first SIM device or second SIM device supports voice communications between the user equipment 110 and the first wireless network 190-1 prior to establishing a wireless communication link between the user equipment 110 and the second wireless network 190-2 that communicates the non-voice wireless communications over the second wireless communication link using the subscriber identity information. This prevents a user from improperly installing multiple SIM devices that only support the OFFLOAD capability and then operating the user equipment 110 to access the network 190-2.

In other words, via flowchart 300, the communication manager 140 of the user equipment 110 can be configured to verify that at least one of the SIM devices 121 or 122 and corresponding subscriber identity information 131 or 132 supports voice communications prior to providing non-voice data communications via the OFFLOAD mode. If both devices support OFFLOAD mode only, then the user equipment 110 can be configured to generate and display a respective notification to the user 108 indicating the condition that no service is available. If at least one of the SIM devices installed in respective slots 141 and 142 supports voice communications, then the user equipment 110 can be configured to access network 190-1 and support voice calls.

Referring to the flowchart 300, in processing operation 310, the communication manager 140 processes the subscriber identity information 131 in the SIM device 121 to determine a network to which the subscriber identity information 121 pertains.

In processing operation 320, the communication manager 140 determines whether the subscriber identity information for the first SIM device in the user equipment 110 being checked is set to support an OFFLOAD mode. If so, then flow continues at processing operation 330.

In processing operation 330, the communication manager 140 processes the subscriber identity information associated with the second SIM device to determine a profile (such as indicating a network) corresponding policy to which the corresponding subscriber identity information pertains.

In processing operation 335, the communication manager 140 determines whether the policy indicates to operate in the offload mode. If so, flow continues at processing operation 340 in which the communication manager 140 generates a corresponding message for display on the display screen 130 of the user equipment 110. In one embodiment, the communication manager 140 displays an error message indicating that none of the SIM devices inserted in the respective slots of the user equipment 110 supports voice communications.

Alternatively, if processing operation 335 indicates that the second accessed SIM device does not indicate the OFFLOAD mode, processing continues at operation 345 during which the user equipment 110 and attaches to the SIM device supporting voice communications.

Further, in processing operation 350, the user equipment reads the primary SIM profile and corresponding policy.

In processing operation 355, if the profile policy does not indicate the offload mode, processing continues at operation 360 in which the communication management 140 enters a standard DSDS dual SIM dual standby mode. Alternatively, if the communication manager 140 detects that the profile policy associated with the primary SIM device profile indicates the offload mode in operation 355, processing continues at operation 365 in which the communication manager 140 enters into the offload mode and, if available, attaches to a network designated for data only.

Processing operation 370 indicates attachment of the user equipment 110 to each of the networks 190 depending on availability.

Referring again to processing operation 320, if the communication manager 140 detects that the corresponding profile policy does not indicate the offload mode, processing continues at operation 375.

In processing operation 375, the communication manager 140 establishes connectivity between the user equipment 110 and the primary network 190-1 supporting voice communications.

In following operation 380, the communication manager 140 reads the second SIM device profile and corresponding policy information. In subsequent processing operation 385, if the profile policy indicates the offload mode, then the communication manager executes operation 390 in which the user equipment 110 enters the offload mode depending on availability of wireless base stations in the secondary network 190-2.

Alternatively, in processing operation 385, if the profile policy of the second SIM does not indicate offload mode, the communication manager 140 continues processing at operation 360 in which the user equipment 110 is operated in a standard dual SIM device dual standby mode.

Further Summary of Offload Mode

In one embodiment, in the case of the user equipment 110 supporting voice and data, the device (user equipment or UE) must support required functionality and regulations for emergency calling. In such an instance, this is why the device cannot function in stand-alone offload mode only.

If this profile is the only active profile (single SIM) on the UE, the device will not switch to the offload mode and will not activate the existing profile. The UE can be configured to show error message.

In a dual SIM device, the UE is switched on, reads the primary SIM profile and policy. If the primary SIM profile policy is designated as offload, the UE will jump to read the secondary SIM. Else it will attach to the primary SIM profile network.

The UE reads each carrier profile on primary and secondary SIM and the policy within the profile. The UE will need to successfully attach to the network that is not designated as offload before attaching to the offload network.

If the profile policy indicates offloading profile, the device will go into offload mode for the profile and carrier network. The profile will be the designated data service by default.

The second active profile will be designated as primary for voice. The UE will go to offload mode for the profile.

While in offload mode, the data will traverse the offload network if there are no voice service sessions on the other network.

Before voice service is established on the other network, data shall move dynamically to the voice network provided the network or subscription supports voice and data.

Referring again to FIG. 1, in accordance with further embodiments, recall that the user equipment 110 includes a MODEM device 111 operable to process received wireless communications from the first wireless network 190-1 and the second wireless network 190-2.

In one embodiment, the user equipment 110 switches between: i) receiving first communications at the modem device 111 from the first wireless network 190-1, and ii) receiving second communications at the modem device 111 from the second wireless network 190-2. The user equipment 110 (at least occasionally) processes the first communications (such as looking for so-called page requests or call alerts such as from one or more of remote communication devices 155) from the first wireless network 190-1 to determine whether any remote device is attempting to establish a voice call with the user equipment 110. However, for a majority of the time, assume that the second wireless network 190-2 is available, and when no call is made or received by the user 108 and corresponding user equipment 110 over the first wireless network 190-1, the user equipment 110 uses the modem device 111 to process non-voice data communications received over the second wireless network 190-2 (assuming that connectivity with the second wireless network 190-2 is established).

Further Summary of Offload Mode

In one embodiment, the offload mode is a specific mode that affects designated networks, network attachment, activation, network scanning, the user interface and function of the networks.

If required by carrier, the user equipment in offload mode can be configured not to display any information to the subscriber regarding the offload network. Although the device (user equipment 110) is using two active networks, the device will appear as if using a single network. This includes the offload network name and signal strength will not be displayed to the subscriber.

In offload mode, the subscriber will not be presented with a user interface to select which network will be the designated data network.

The offload network will be designated as the default data service (DDS) network. The second network will be designated the primary network for voice and data (V+D) by default.

In offload mode, the network SIM activation for offload network will be based on geo-location function where coverage is available.

Figure 4:
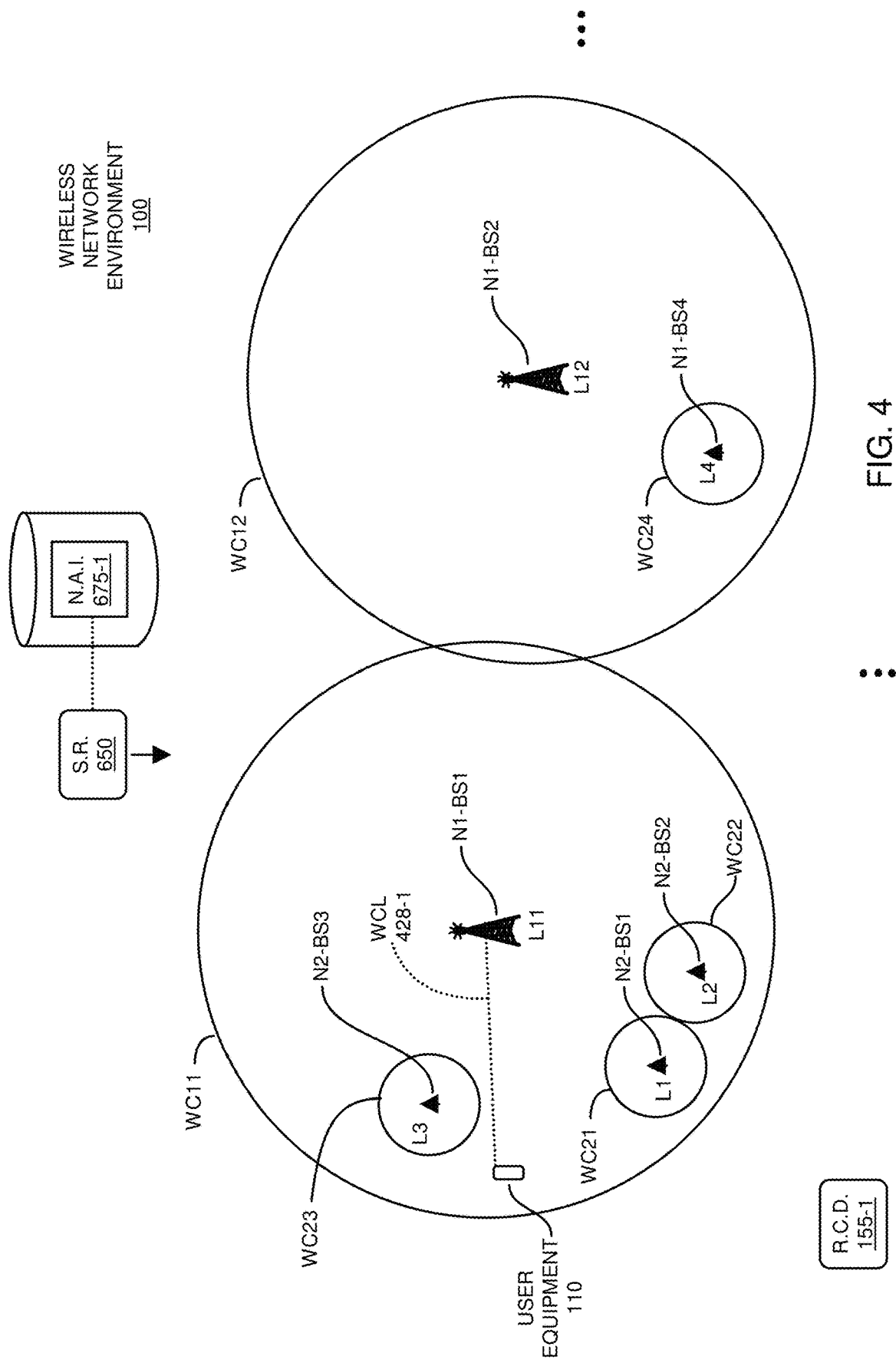
FIG. 4 is an example diagram illustrating a wireless network environment and use of multiple sets of subscriber identity information according to embodiments herein.

FIG. 4 is an example diagram illustrating of a multi-layer network and corresponding use of same according to embodiments herein.

In this example embodiment, the network environment 100 includes server resource 650 operable to distribute network address information 675-1. Network environment 100 further includes network 190-1 and network 190-2.

Further in this example embodiment, network 190-1 includes wireless base station N1-BS1 (such as any of one or more resources such as cell node, base station, enodeB, etc.) at location L11, wireless base station N1-BS2 at location L12, and so on.

Network 190-2 includes wireless base station N2-BS1 at location L1, wireless base station N1-BS2 at location L2, wireless base station N1-BS3 at location L3, wireless base station N1-BS4 at location L4, etc.

The purpose of geo location function as described herein is to grant the UE capability to know when to use and activate the proper offload profile on a respective SIM. By providing geo location for the offload network coverage area, the UE can start scanning for the required network as soon as the UE enters coverage. This will maximize the offload percentage and preserve UE resources.

In accordance with further embodiments, the geo location function includes a method or function and a geo location database that contains location data related to the offloading network profiles. This geo location data will include profile id, profile priority, MCC, Cell ID, EARFN, and GPS longitude and latitude. The device (user equipment 110) will maintain a table of the geo location data based on the country code where the device is located. This table will be updated by device operating system or over the top (OTT) application.

One embodiment herein includes three cascading geo location methods to determine if the user equipment 110 is within coverage of the required offload network. The reason for using cascading method is to overcome limitations, making the system more accurate and reliable.

First level function: embodiments herein include using a public land mobile network (PLMN) which contains the MCC (Mobile Country Code). The PLMN for the network will determine if the user equipment is going to be roaming or within general geographic coverage area. This is not an accurate location method, but it will give direct indication if the device is within the country of service.

Second level function: if the first level is met, embodiments herein include cell identification for the primary network in conjunction with GPS location to determine if the device is in an area of coverage for a small cell in network 190-2. The location database table (network availability information) can be configured to include information such as Cell ID, EARFN, and GPS Coordinates with radius value to enable the geo location to determine if the user equipment is within coverage area of offload network.

GPS location function: embodiments herein include searching within a radius distance of stored longitudes and latitudes of existing eNodeB to determine if the user equipment is in a small cell region of wireless coverage associated with network 190-2.

Geo Location with MCC

In this mode, the user equipment 110 will scan for required PLMN to connect to the primary SIM network. The device will determine the MCC broadcast from the attached networks by the primary SIM profile. For example, MCC 310 is for USA.

The user equipment 110 (a.k.a., device) compares the broadcast network MCC (mobile country code, part of the PLMN) scanned on the primary SIM network with the Geo location table entries for MCC and determine the available offload profile and networks if exist.

If the MCC matches an existing MCC in the geo location table, the geo location function will proceed to select the corresponding offload profile and proceed to the next geo location method using GPS and Cell ID.

If the MCC does not match any of the MCC values within the Geo location table, the geo location method will request the eSIM profile to be disabled if active.

If the MCC does match with existing MCC entry in the geo location table with a profile that is deferent than the existing active profile, the geo location function will proceed to select the corresponding offload profile with higher priority.

Geo Location with Cell ID

Cell ID is a unique number used to identify each sector on a base station.

Each eNodeB sector will have a combined Cell ID and EARFCN uniquely assigned by the carrier and collected by multiple public databases.

The device will have the values of Cell ID for the primary SIM network.

The values for Cell ID within offload network coverage is stored in the geo location database.

Cell ID data provided to the database can be obtained through active scanning or obtained from a third party.

Geo Location with GPS Information

GPS location is based on GPS longitude and latitude for the center of coverage area of eNodeB and the radius distance that represents an estimation of the coverage area.

Although this will give a circular representation of the coverage area, it will be adequate to activate the corresponding profile and start the scanning process to latch to the network.

The radius distance from the center of the coverage area of eNodeB can be configured based on required quality of coverage and bandwidth.

The longitude, latitude and radius values are stored in the geo location database and provided to the device in the geo location table.

Geo Location Algorithm

A device can utilize the MCC, neighboring Cell ID or location coordinates to establish location-based awareness of existing networks' coverage and initiate scanning or network connections.

This information is maintained in a geo location table on the UE itself or can be stored in the SIM/eSIM files. The data can be updated over the air from geo location database centralized servers.

The function can be invoked or executed by the modem firmware, an external over-the-top function, or an applet provided in the SIM and activated by location changes.

If the device detects offload network coverage during scanning, the function will store or update the network metrics and location coordinates on the geo location table which will be synchronized with the geo location database.

If the device is in proximity of available coverage, the device will initiate scanning for the offloading network.

If the device is not within proximity of any offloading network coverage, the device will disable the profile or set the scanning cycle to low scanning intervals.

Further in this example embodiment, the communication manager 140 of the user equipment 110 retrieves network availability information 675-1 (a.k.a., geographical location table) from a wireless station or other suitable resource. Details of the network availability information 675-1 are shown in FIG. 5.

Figure 5:
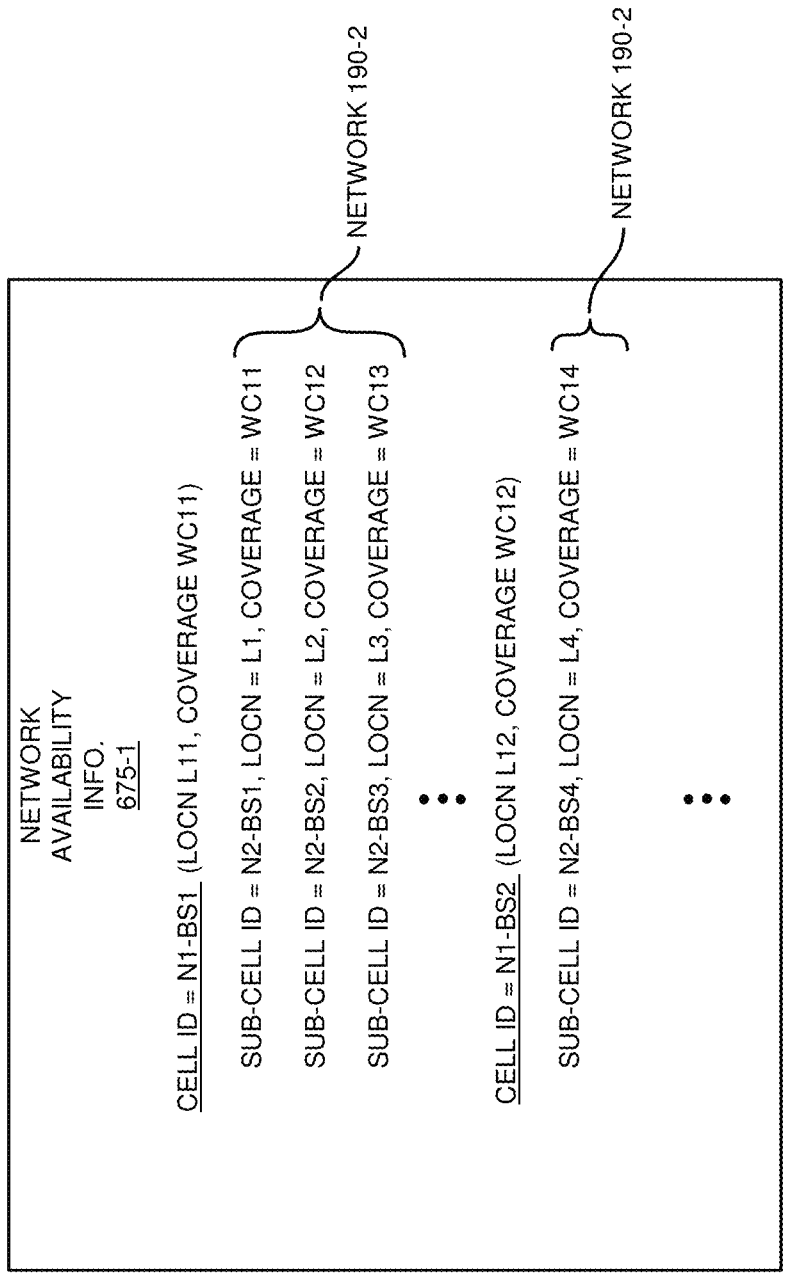
FIG. 5 is an example diagram illustrating network availability information according to embodiments herein.

FIG. 5 is an example diagram illustrating of network availability information according to embodiments herein.

As shown, the network availability information 675-1 in this example embodiment indicates that network 190-1 includes a first wireless station N1-BS1 (at location L11 and which provides region of wireless coverage WC11), which is assigned unique identifier value N1-BS1; the network availability information 675-1 further indicates that network 190-1 includes a second wireless station N1-BS2 (at location L12 and provides region of wireless coverage WC12), which is assigned unique identifier value N1-BS12; and so on.

The network availability information 675-1 also indicates the different wireless stations associated with network 190-2 that are present in each region of wireless coverage associated with the first wireless network 190-1. For example, the network availability information 675-1 indicates that wireless stations N2-BS1, N2-BS2, N2-BS3, etc., reside within region of wireless coverage WC11 provided by wireless station N1-BS1; network availability information 675-1 indicates that wireless stations N2-BS4, etc., reside within region of wireless coverage WC12 provided by wireless station N1-BS2; and so on.

In accordance with further embodiments, as further shown in FIG. 5, the network availability information 675-1 can be configured to indicate a respective location and size of a corresponding region of wireless coverage provided by a wireless station in the network 190-2.

For example, the network availability information 675-1 indicates that the wireless station N2-BS1 (of network 190-2) resides at location L1 in the network environment 100 and provides a region of wireless coverage WC11; the network availability information 675-1 indicates that the wireless station N2-BS2 resides at location L2 in the network environment 100 and provides a region of wireless coverage WC12; the network availability information 675-1 indicates that the wireless station N2-BS3 resides at location L3 in the network environment 100 and provides a region of wireless coverage WC13; and so on.

Referring again to FIG. 4, in one embodiment, the communication manager 140 of the user equipment 110 also receives location information (such as via GPS or Global Positioning System information generated by user equipment 110 or other device) indicating a current location of the user equipment 110 in a region of wireless coverage WC11 provided by the wireless station N2-BS1 in the first wireless network 190-1.

The communication manager 140 receives an identifier (value=N2-BS1) assigned to the wireless station N2-BS1 when creating wireless communication link 428-1. In such an instance, the communication manager 110 uses the current location of the user equipment 110 to identify if the user equipment 110 resides within a region of wireless coverage associated with the OFFLOAD network. Because the communication manager 140 does not detect that the user equipment 110 resides within a region of wireless coverage associated with network 190-2 in this example, the communication manager 140 uses the wireless communication link 428-1 to communicate both voice and non-voice type data communications. For example, a first portion of wireless communication link 428-1 supports voice communications with remote communication device 155-1; a second portion of wireless communication link 428-2 supports non-voice data communications with the one or more server resources 195.

Figure 6:
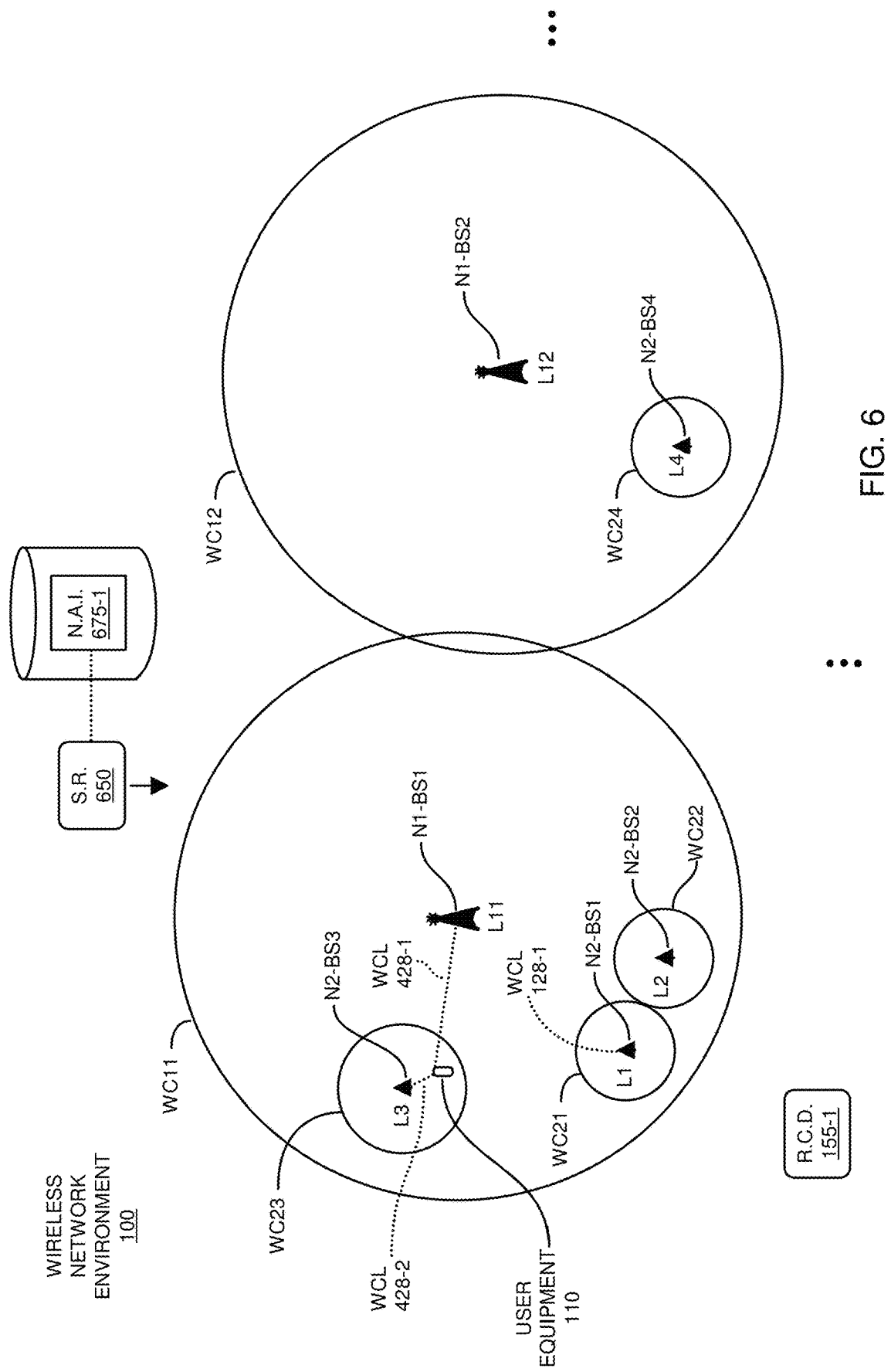
FIG. 6 is an example diagram illustrating a multi-layer network and corresponding use of same according to embodiments herein.

FIG. 6 is an example diagram illustrating of a multi-layer network and corresponding use of same according to embodiments herein.

In this example embodiment, while the user equipment 110 is wirelessly connected to the wireless station N1-BS1 (such as to receive voice communications and/or non-voice communications) via wireless communication link 428-1, the user 108 moves about such that the user equipment 110 eventually receives updated location information indicating that it (user equipment 110) currently resides in region of wireless coverage WC23 (associated with cell identifier=N1-BS1).

In one embodiment, the communication manager 140 continuously compares the received updated location of the user equipment 110 to the different regions of wireless coverage to determine when an OFFLOAD condition to the second wireless network 190-2 is possible.

In one embodiment, in response to detecting that the user equipment 110 and its current location reside within the region of wireless coverage WC23 as indicated by the network availability information 675-1, the communication manager 140 offloads the user equipment 110 to the network 190-2 via establishing new or additional wireless communication link 428-2.

More specifically, to provide offloading, the communication manager 140 initiates establishing a respective new wireless communication link 428-2 between the user equipment 110 and the wireless station N1-BS3 in network 190-2 to support non-voice data communications (such as one page communications, email retrieval, etc.) between the user equipment 110 and the one or more server resources 195-1, 195-2, etc. The prior existing wireless communication link 428-1 continues to support voice communications (such as inbound voice phone calls and respective call alerts, paging, etc., from the remote communication device 155-1 to the user equipment 110, outbound voice phone calls from the user equipment 110 to the remote communication device 155-1, etc.).

Thus, via the network availability information 675-1, the communication manager 140 of the user equipment 110 can be configured to map the current location of the user equipment to a wireless station N1-BS3 in the second wireless network 190-2 to initiate offloading of data communications associated with the user equipment 110 over the wireless communication link 428-2 to the wireless network 190-2.

Figure 7:
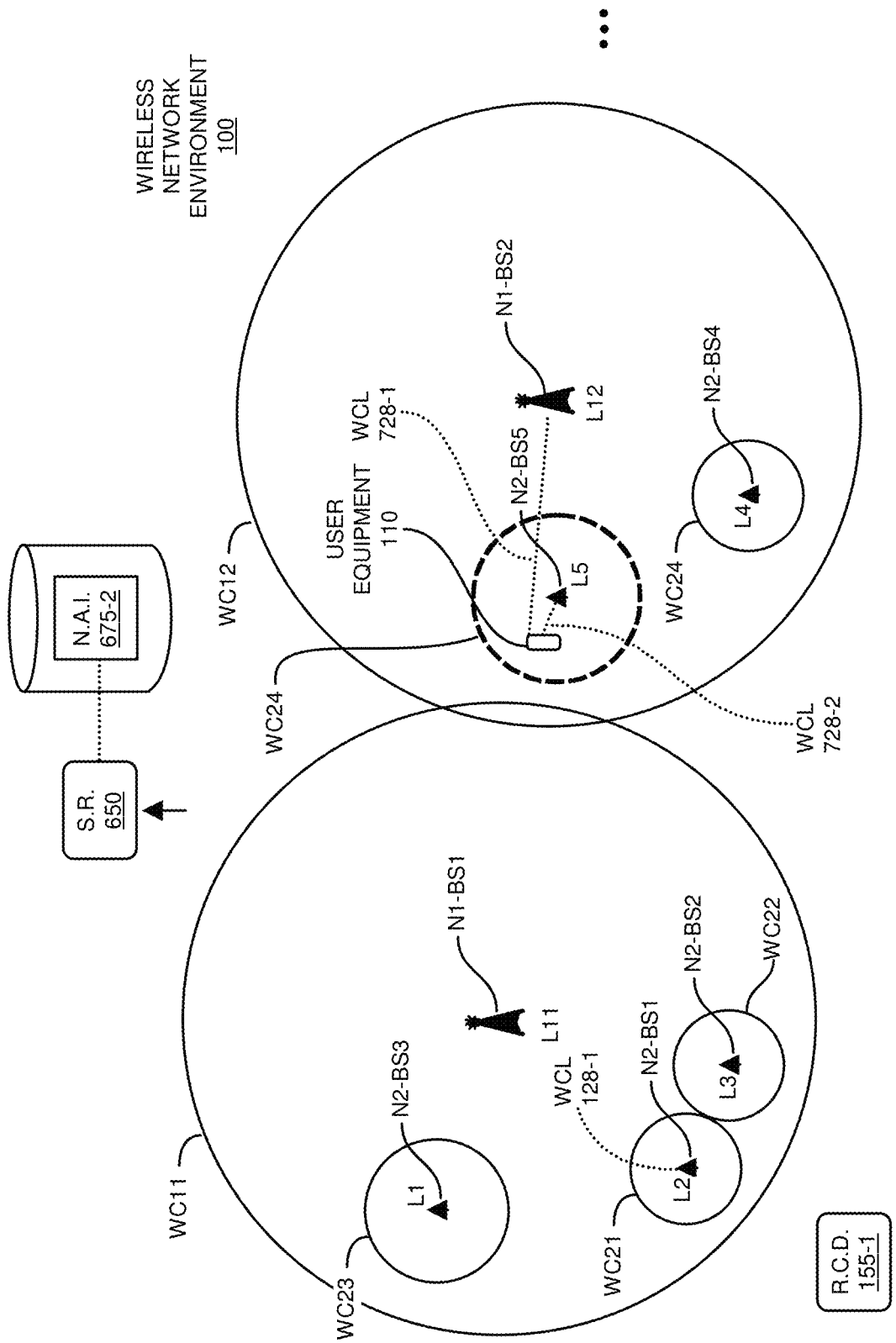
FIG. 7 is an example diagram illustrating a multi-layer network and corresponding use of same according to embodiments herein.

FIG. 7 is an example diagram illustrating a multi-layer network and corresponding use of same according to embodiments herein.

In the event that the current location of the user equipment is unknown, or that the user equipment 110 does not currently reside in a region of wireless coverage provided by the second network 190-2, the user equipment 110 can be configured to monitor wireless communications from wireless stations in network 190-2 while the user equipment 110 is present in a region of wireless coverage provided by a wireless station in the first wireless network. The user equipment 110 can be configured to send out a beacon for any wireless stations in a region and listen for a response indicating presence of a wireless station to detect presence of any unknown wireless stations. Alternatively, in accordance with further embodiments, note that the user equipment may not be able to or configured to send a beacon (discovery message). In such an instance, embodiments herein include detecting process of the first network to get information that will be used by the connection manager to lookup in availability data for available coverage of network 2: in the detect process, the UE tuning to a specific frequency and going through synchronization process and decoding basic information of the cell (e.g, Physical Cell ID and basic MIB/SIB information).

In this example embodiment, the communication manager 140 initially establishes wireless communication link 728-1 to support voice and/or non-voice communications. The user equipment 110 receives notification (via a cell identifier from the wireless station N1-BS2) that it is in communication with the wireless station N1-BS2.

Using previously received network availability information 675-1, the communication manager 140 determines or attempts to determine whether the user equipment 110 resides in any region of wireless coverage associated with a wireless station in network 190-2. In this example embodiment, assume that the communication manager 140 detects that no wireless station is available in network 190-2.

However, as previously discussed, the communication manager 140 can be configured to monitor the region of wireless coverage for beacons associated with the second wireless network 190-2. In response to detecting presence of the wireless station N2-BS4 at or around location L5 via the monitored wireless communications received from any suitable resource, in accordance with subscriber identity information 132, the user equipment 110 establishes a new wireless communication link 728-2 with the wireless station N2-BS4 in the second wireless network 190-2.

Via the newly established supplemental wireless communication link 728-2 with the wireless station N2-BS4 in the second wireless network 190-2, the user equipment 110 communicates (offloads) the non-voice wireless communications between the user equipment 110 and the remote network.

Further in this example embodiment, in response to detecting presence of the wireless station N2-BS4 of the second wireless network while in region of wireless coverage WC12, the user equipment 110 updates the network availability information 675-1 to indicate the wireless station N2-BS4 and its availability in the region of wireless coverage WC12 provided by the wireless station N1-BS2 in the first wireless network 190-1. Thus, the user equipment 110 can be configured to provide notification of the availability of the detected wireless station in the second wireless network to a central authority (server resource 650) tracking locations of wireless stations associated with the second wireless network 190-2. Server resource 650 notifies other mobile communication devices in the region of wireless coverage of the availability of wireless station N2-BS4 in the region of wireless coverage WC12.

Figure 8:
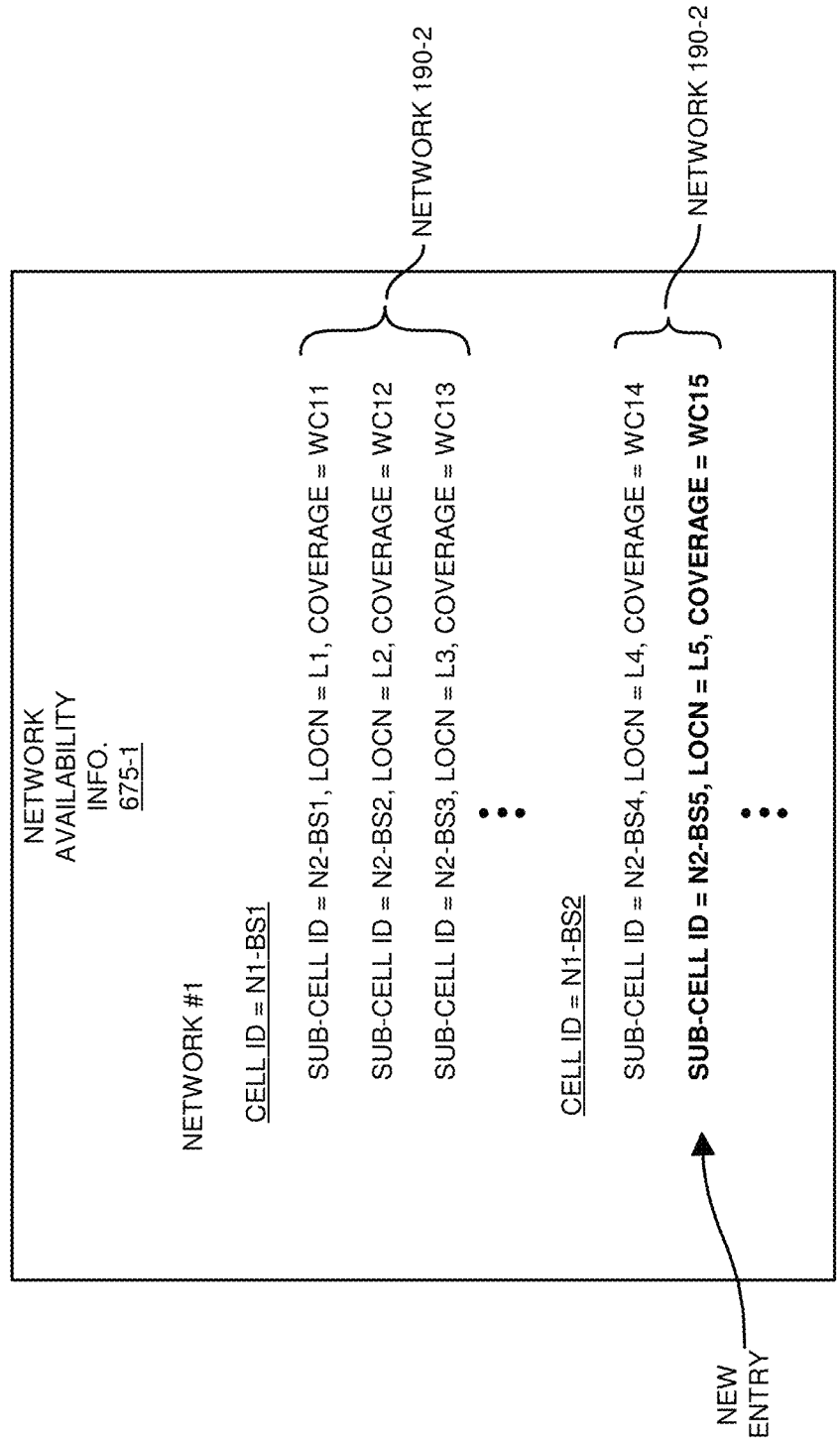
FIG. 8 is an example diagram illustrating updating of network availability information according to embodiments herein.

FIG. 8 is an example diagram illustrating application of updates to network availability information according to embodiments herein.

In this example embodiment, in response to notification from the user equipment 110 of the presence of wireless station N2-BS4, the communication manager 140 communicates with the server resource 650, notifying the server resource of the presence of the wireless station N2-BS4 at or around location L5.

In response to receiving the notification of the presence of the wireless station N2-BS5 in the region of wireless coverage WC12, the server resource 650 updates the network availability information 675-1 to indicate presence of the wireless station N2-BS4 such as at or around location L5. The updated network availability information 675-2 in FIG. 8 includes the new entry indicating the newly detected wireless station N2-BS5. Via network availability information 675-2, the server resource 650 notifies other mobile communication devices in region of wireless coverage WC12 of the availability of the secondary network 190-2 and corresponding wireless station N2-BS5 at or around location L5.

Figure 9:
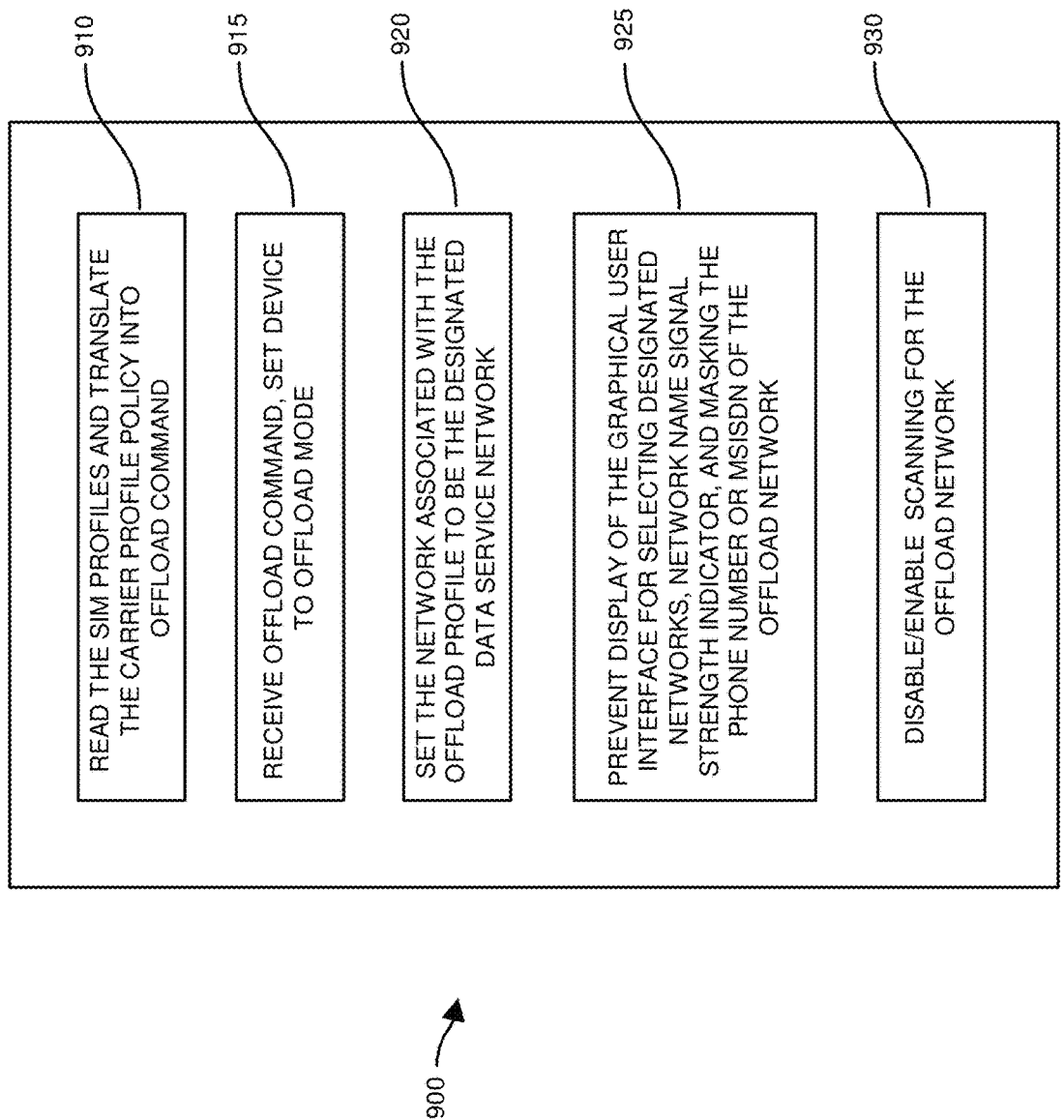
FIG. 9 is an example diagram illustrating operations according to embodiments herein.

FIG. 9 is an example diagram illustrating general operations regarding use of different subscriber identity information according to embodiments herein.

Flowchart 900 illustrates implementation of a dual SIM user equipment device and discovering of networks.

In processing operation 910, the communication manager 140 (such as an operating system) reads the SIM or eSIM profiles and policies within the profile (such as subscriber identity information for each of multiple SIM devices) and translates a respective carrier profile for one of the SIM devices into an OFFLOAD command.

In processing operation 915, the communication manager 140 sets the user equipment 110 to an OFFLOAD mode in accordance with the OFFLOAD command.

If the policy indicates offloading mode profile, the device will go into offload mode for the profile and carrier network.

If this profile is the only active profile (single SIM) on the device the device will not switch to the offload mode.

If the profile is not the only active profile on the device and the profile is the designated data offload, the device will go to offload mode for the profile.

In processing operation 920, the communication manager 140 selects the network associated with the OFFLOAD profile to be the designated data service network for the user equipment 110. By default the alternate SIM will be designated as the default voice profile. For example, the other carrier profile (for non-voice communications), such as associated with subscriber identity information 131, is designated for use of the primary network 190-1. If voice service is established on the primary voice network 190-1, data shall move dynamically to the primary network.

In processing operation 925, the communication manager and/or operating system 140 prevents display of a graphical user interface requiring the user to select and assign subscriber identity information (SIM devices) to different networks. As described herein, in one embodiment, the subscriber identity information 132 is pre-programmed to indicate that the OFFLOAD mode is supported by the SIM device 122. In accordance with further example embodiments, the communication manager 140 prevents display of a network name and corresponding signal strength indicator of the one or more different networks 190-1, 190-2, etc., as it is not needed for a user to select which SIM device is to be used for the OFFLOAD mode. If desired, the communication manager 140 also masks the phone number or MSISDN (Mobile Subscriber Integrated Services Directory Number) of the offload network. As previously discussed, the profile information associated with the subscriber identity information indicates to which network the subscriber identity information pertains. Thus, in offload mode, a function can be enabled or disabled by a respective carrier that will hide or mask the standard user interface implemented for DSDS mode. This includes eliminating the need of the user selecting primary and secondary voice and data networks.

In processing operation 930, the communication manager disables/enables scanning for the offload network (such as network 190-2) in a manner as previously discussed. For example, in the offload mode, network profile activation and scanning will be controlled by the geo location function.

Figure 10:
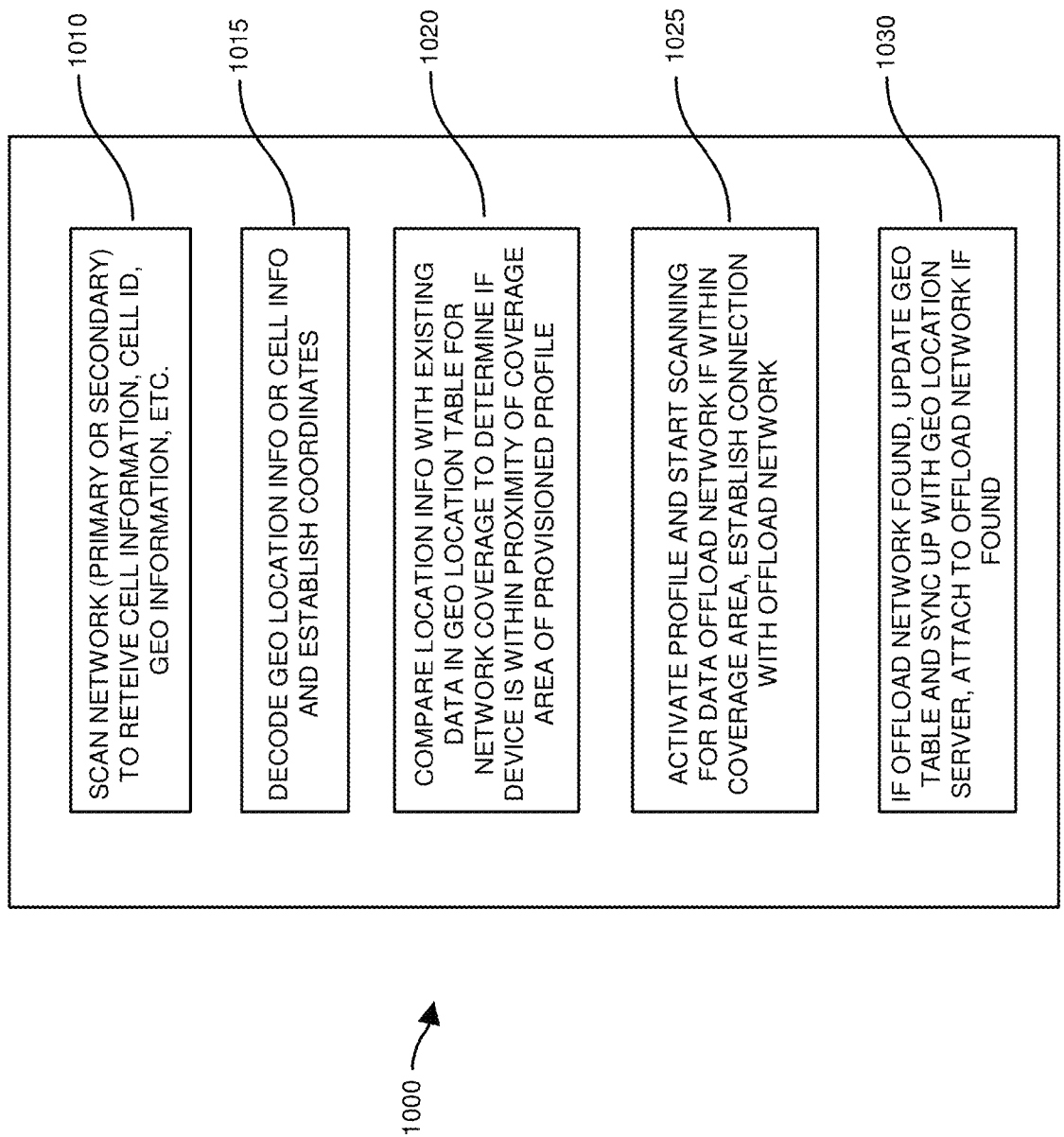
FIG. 10 is an example diagram illustrating operations according to embodiments herein.

FIG. 10 is an example diagram illustrating general operations regarding use of different subscriber identity information according to embodiments herein.

Flowchart 1000 illustrates a function for activating network profile and network scanning as part of a network attachment process, utilizing geo location information.

In processing operation 1010, the communication manager 140 scans network environment 100 (such as primary network 190-1 and/or secondary network 190-2) to retrieve corresponding PLMN cell information, cell identifier information, geographical information, etc., and establish location-based awareness.

In processing operation 1015, the communication manager 140 decodes geolocation information or cell information and also determines the location of the user equipment 110.

In processing operation 1020, the communication manager 140 compares a current location of the user equipment 110 with existing data in a geolocation table (network availability information) for network coverage to determine if the user equipment 110 is inside a corresponding wireless coverage area provided by the offload network (secondary network 190-2) as specified by a corresponding carrier profile.

In processing operation 1025, the communication manager 140 activates the profile and starts scanning for data offload network if within a respective wireless coverage area to establish a connection with the offload network (such as secondary network 190-2). If the user equipment is in a coverage area, then activate profile and start the attachment process. Otherwise, wait for the next geo location update.

In processing operation 1030, if the offload network is found, the communication manager 140 establishes a respective wireless communication link between the user equipment 110 and the secondary network 190-2 for non-voice data communications. As previously discussed, the communication manager 140 can be configured to update a geographical table information and sync up that geographical location information with a master server that stores information about subnetworks in network 190-2 available within network 190-1. Thus, if the offload network 190-2 is found, update the geo location table information (network availability information) and sync up with the backend geo location server (server resource 650). Start attachment process. If no coverage is found, update the coverage information table and backend server.

Figure 11:
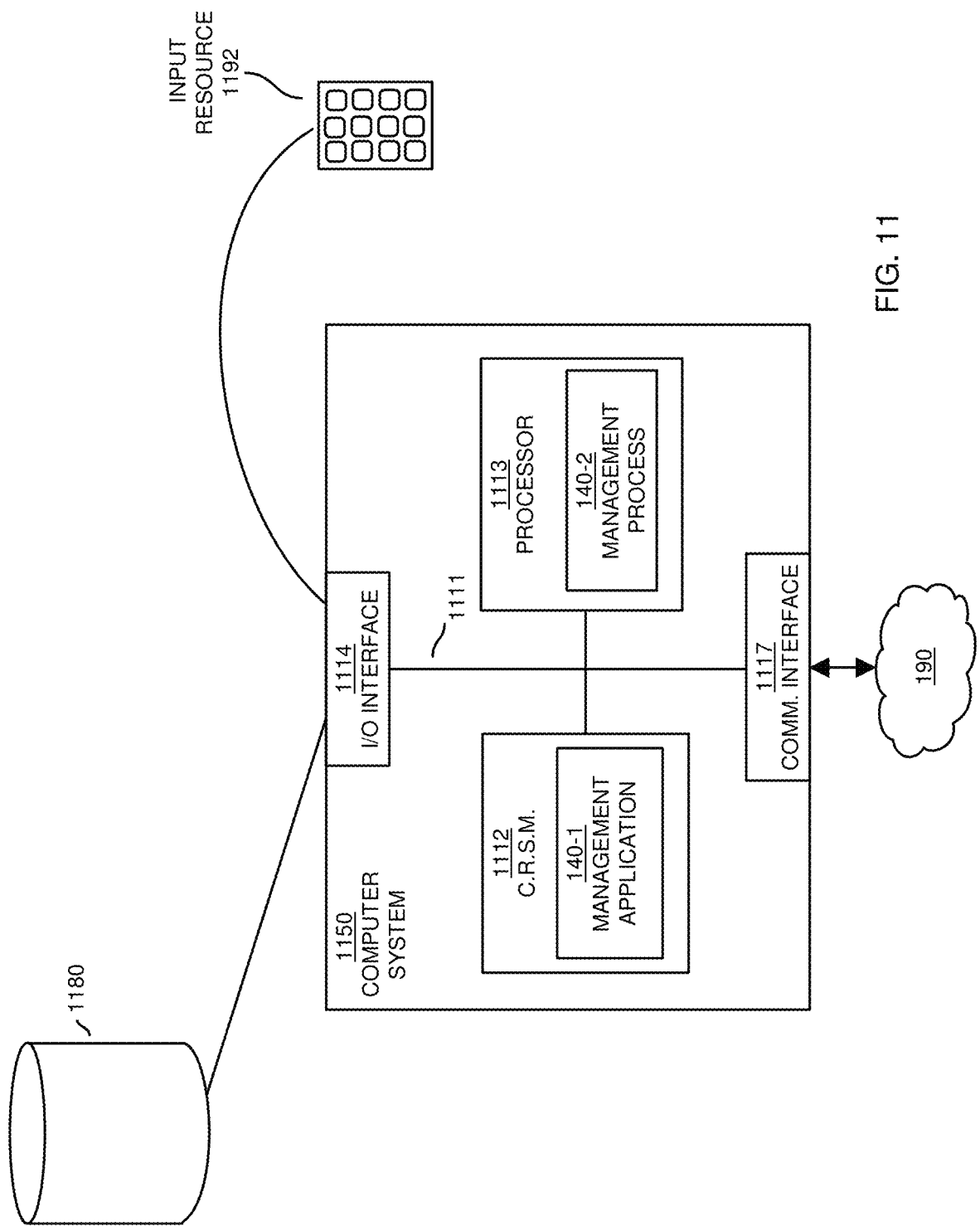
FIG. 11 is an example diagram illustrating example computer architecture operable to execute one or more operations according to embodiments herein.

FIG. 11 is an example block diagram of a computer system for implementing any of the operations as previously discussed according to embodiments herein.

Any of the resources (such as each of one or more wireless communication devices, gateway resources, network server, application servers 160, communication management resource 140, etc.) as discussed herein can be configured to include computer processor hardware and/or corresponding executable (software) instructions to carry out the different operations as discussed herein.

As shown, computer system 1150 of the present example includes an interconnect 1111 coupling computer readable storage media 1112 such as a non-transitory type of media (which can be any suitable type of hardware storage medium in which digital information can be stored and retrieved), a processor 1113 (computer processor hardware), I/O interface 1114, and a communications interface 1117.

I/O interface(s) 1114 supports connectivity to repository 1180 and input resource 1192.

Computer readable storage medium 1112 can be any hardware storage device such as memory, optical storage, hard drive, floppy disk, etc. In one embodiment, the computer readable storage medium 1112 stores instructions and/or data.

As shown, computer readable storage media 1112 can be encoded with management application 140-1 (e.g., including instructions) to carry out any of the operations as discussed herein.

During operation of one embodiment, processor 1113 accesses computer readable storage media 1112 via the use of interconnect 1111 in order to launch, run, execute, interpret or otherwise perform the instructions in in the management application 140-1 stored on computer readable storage medium 1112. Execution of the management application 140-1 produces management process 140-2 to carry out any of the operations and/or processes as discussed herein.

Those skilled in the art will understand that the computer system 1150 can include other processes and/or software and hardware components, such as an operating system that controls allocation and use of hardware resources to execute management application 140-1.

In accordance with different embodiments, note that computer system may reside in any of various types of devices, including, but not limited to, a mobile computer, wireless communication device, gateway resource, communication management resource, a personal computer system, a wireless device, a wireless access point, a base station, phone device, desktop computer, laptop, notebook, netbook computer, mainframe computer system, handheld computer, workstation, network computer, application server, storage device, a consumer electronics device such as a camera, camcorder, set top box, mobile device, video game console, handheld video game device, a peripheral device such as a switch, modem, router, set-top box, content management device, handheld remote control device, any type of computing or electronic device, etc. The computer system 850 may reside at any location or can be included in any suitable resource in any network environment to implement functionality as discussed herein.

Functionality supported by the different resources will now be discussed via flowchart in FIG. 12. Note that the steps in the flowcharts below can be executed in any suitable order.

Figure 12:
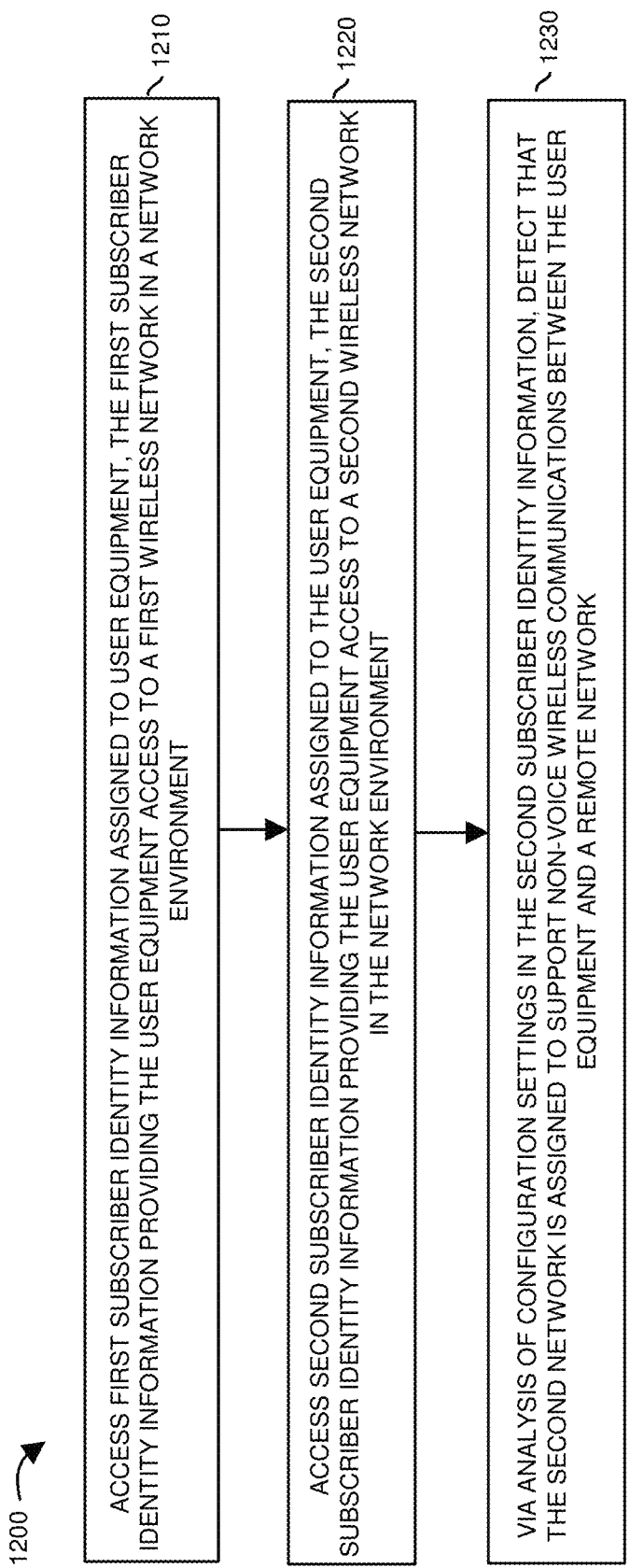
FIG. 12 is an example diagram illustrating a method according to embodiments herein.

FIG. 12 is a flowchart 1200 illustrating an example method according to embodiments herein. Note that there will be some overlap with respect to concepts as discussed above.

In processing operation 1210, the communication manager 140 accesses first subscriber identity information 131 assigned to user equipment 110. The first subscriber identity information 131 provides the user equipment access to a first wireless network (N1) in a network environment 100.

In processing operation 1220, the communication manager 140 accesses second subscriber identity information 132 assigned to the user equipment 110. The second subscriber identity information 132 provides the user equipment 110 access to a second wireless network (N2 or OFFLOAD network) in the network environment 100.

In processing operation 1230, via analysis of configuration settings in the second subscriber identity information 132, the communication manager 140 detects that the second network is assigned to support non-voice wireless communications (such as data communications) between the user equipment 110 and a remote network.

Note again that techniques herein are well suited to facilitate wireless communications in a wireless network environment over multiple different networks. However, it should be noted that embodiments herein are not limited to use in such applications and that the techniques discussed herein are well suited for other applications as well.

Based on the description set forth herein, numerous specific details have been set forth to provide a thorough understanding of claimed subject matter. However, it will be understood by those skilled in the art that claimed subject matter may be practiced without these specific details. In other instances, methods, apparatuses, systems, etc., that would be known by one of ordinary skill have not been described in detail so as not to obscure claimed subject matter. Some portions of the detailed description have been presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm as described herein, and generally, is considered to be a self-consistent sequence of operations or similar processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has been convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a computing platform, such as a computer or a similar electronic computing device, that manipulates or transforms data represented as physical electronic or magnetic quantities within memories, registers, or other information storage devices, transmission devices, or display devices of the computing platform.

While this invention has been particularly shown and described with references to preferred embodiments thereof, it will be understood by those skilled in the art that various changes in form and details may be made therein without departing from the spirit and scope of the present application as defined by the appended claims. Such variations are intended to be covered by the scope of this present application. As such, the foregoing description of embodiments of the present application is not intended to be limiting. Rather, any limitations to the invention are presented in the following claims.

I claim:

1. A method comprising:
   accessing first subscriber identity information stored in a first SIM storage entity, the first subscriber identity information assigned to user equipment, the first subscriber identity information providing the user equipment access to a first wireless network in a network environment;
   accessing second subscriber identity information stored in a second SIM storage entity, the second subscriber identity information assigned to the user equipment, the second subscriber identity information providing the user equipment access to a second wireless network in the network environment;
   via analysis of configuration settings in the second subscriber identity information: i) detecting that the second network is assigned to support non-voice wireless communications between the user equipment and a remote network, and ii) detecting an indication to operate the user equipment in an offload mode to support the non-voice wireless communications; and
   in response to detecting the indication to operate in the offload mode to support the non-voice wireless communications, executing a corresponding offload command to operate the user equipment in the offload mode in which connectivity supporting the non-voice wireless communications is switched over from the first wireless network to the second wireless network.

2. The method as in claim 1, wherein the first wireless network is assigned to support voice communications between the user equipment and the remote network, the method further comprising:
   establishing a first wireless communication link with the first wireless network that supports the voice communications prior to establishing a second wireless communication link supporting the non-voice wireless communications with the second wireless network.

3. The method as in claim 1 further comprising:
   in accordance with the first subscriber identity information, establishing a first wireless communication link between the user equipment and the first wireless network, the established first wireless communication link supporting voice communications associated with the user equipment; and
   communicating non-voice data over the established first wireless communication link in accordance with the first subscriber identity information in response to detecting that the second wireless network is unavailable.

4. The method as in claim 3 further comprising:
   in response to detecting availability of the second wireless network at a current location where the user equipment resides, establishing a second wireless communication link extending between the user equipment and the second wireless network; and
   communicating the non-voice data over the established second wireless communication link.

5. The method as in claim 1 further comprising:
   based on analysis of both the first subscriber identity information and the second subscriber identity information, verifying that the first subscriber identity information supports voice communications between the user equipment and the first wireless network prior to establishing a wireless communication link between the user equipment and the second wireless network that communicates the non-voice wireless communications over the second wireless communication link.

6. The method as in claim 1 further comprising:
   at the user equipment, switching between: i) receiving first communications at a modem device from the first wireless network, and ii) receiving second communications at the modem device from the second wireless network.

7. The method as in claim 6, wherein the user equipment processes the first communications to determine whether a remote device is attempting to establish a voice call with the user equipment; and
   wherein the second communications are non-voice data communications retrieved by the user equipment.

8. The method as in claim 7 further comprising:
   in response to detecting occurrence of the remote device attempting to establish the voice call with the user equipment, and acceptance of the voice call by a user of the user equipment, controlling operation of the modem device to support communications between the user equipment and the remote device over the first wireless network in accordance with the first subscriber identity information.

9. The method as in claim 1 further comprising:
   switching from receiving the non-voice wireless communications from the first wireless network and the second wireless network depending on availability of the second wireless network, the second wireless network being a default network assigned a higher priority than the first wireless network over which to receive the non-voice wireless communications.

10. The method as in claim 1 further comprising:
maintaining a second communication link between the user equipment and the second wireless network as being active while the user equipment receives voice communications and the non-voice wireless communications over a first communication link from the first wireless network; and
switching to receiving the non-voice wireless communications from the second wireless network in response to termination of receiving the voice communications from the first wireless network.

11. The method as in claim 1 further comprising:
switching from receiving the non-voice wireless communications from the first wireless network to receiving the non-voice wireless communications from the second wireless network depending on a location of the user equipment in a region of wireless coverage provided by the first wireless network.

12. The method as in claim 1, wherein the configuration settings of the second subscriber identity information include a carrier profile of a corresponding service provider providing wireless connectivity via the second wireless network.

13. The method as in claim 1, wherein the first subscriber identity information is stored in a first SIM (Subscriber Identity Module) device inserted into a first slot of the user equipment, the first subscriber identity information retrieved from the first SIM device; and
wherein the second subscriber identity information is stored in a second SIM (Subscriber Identity Module) device inserted into a second slot of the user equipment, the second subscriber identity information retrieved from the second SIM device.

14. The method as in claim 13, wherein the configuration settings indicating assignment of supporting the non-voice wireless communications are pre-programmed in the second SIM device prior to the second SIM device being inserted into the second slot of the user equipment.

15. The method as in claim 14, wherein an operating system of the user equipment is operable to access the pre-programmed configuration settings of the second subscriber identity information as an alternative to a user of the user equipment providing input specifying which of the first SIM device and the second SIM device present in the user equipment is to provide wireless service for the non-voice wireless communications.

16. The method as in claim 1 further comprising:
based on analysis of the first subscriber identity information and the second subscriber identity information: i) designating the first wireless network as a default to support voice wireless communications, and ii) designating the second wireless network as a default to support the non-voice wireless communications, the second wireless network providing multiple regions of wireless coverage to support the non-voice wireless communications within a single region of wireless coverage provided by the first wireless network.

17. The method as in claim 1 further comprising:
communicating from the user equipment to a wireless station in the first wireless network to determine availability of a wireless station in the second wireless network that supports the non-voice wireless communications.

18. The method as in claim 1 further comprising:
via the user equipment, retrieving network availability information from a wireless station in the first wireless network;
receiving location information indicating a current location of the user equipment in a region of wireless coverage provided by the wireless station in the first wireless network;
via the network availability information, mapping the current location of the user equipment to a wireless station in the second wireless network;
establishing a wireless communication link with the wireless station in the second wireless network in accordance with the second subscriber identity information; and
via the established wireless communication link with the wireless station in the second wireless network, communicating the non-voice wireless communications between the user equipment and the remote network.

19. The method as in claim 18, wherein mapping the current location of the user equipment to the wireless station in the second wireless network includes:
via the network availability information received from the wireless station in the first wireless network, identifying a region of wireless coverage provided by the wireless station in the second wireless network; and
establishing the wireless communication link with the wireless station in the second wireless network in response to detecting that the current location resides within the region of wireless coverage provided by the wireless station in the second wireless network.

20. The method as in claim 1 further comprising:
via the user equipment, retrieving network availability information from a wireless station in the first wireless network;
via the network availability information, detecting that a wireless station in the second wireless network resides within a region of wireless coverage provided by the wireless station in the first wireless network;
via the user equipment, monitoring wireless communications in a region of wireless coverage provided by the wireless station in the second wireless network;
in response to detecting presence of the wireless station in the second wireless network via the monitored wireless communications, establishing a wireless communication link with the wireless station in the second wireless network; and
via the established wireless communication link with the wireless station in the second wireless network, communicating the non-voice wireless communications between the user equipment and the remote network.

21. The method as in claim 20 further comprising:
in response to detecting presence of the wireless station in the second wireless network, updating the network availability information to indicate the wireless station in the second wireless network and its availability in the region of wireless coverage provided by the wireless station in the first wireless network; and
providing notification of the availability of the detected wireless station in the second wireless network to a central authority tracking locations of wireless stations associated with the second wireless network.

22. The method as in claim 1, wherein operating the user equipment in the offload mode includes:
detecting availability of the second network; and
handing off the connectivity supporting the non-voice wireless communications from the first wireless network to the second wireless network.

23. The method as in claim 22 further comprising:
detecting the availability of the second network based on a location of the user equipment in the network environment.

24. The method as in claim 22 further comprising:
detecting the availability of the second network based on receipt of a wireless communication from the second wireless network.

25. The method as in claim 1, wherein switchover from the first wireless network to the second wireless network during the offload mode is not reported to a user of the user equipment.

26. The method as in claim 1, wherein operating the user equipment in the offload mode includes triggering the user equipment to search for presence of the second wireless network and switchover the connectivity supporting the non-voice wireless communications from the first wireless network to the second wireless network as the user equipment moves about the network environment.

27. The method as in claim 26, wherein the switchover of the connectivity supporting the non-voice wireless communications from the first wireless network to the second wireless network includes:
conveying the non-voice wireless communications over a first wireless link between the user equipment and a first wireless base station, the first wireless base station disposed in the first wireless network, the first wireless base station supporting a first region of wireless coverage; and
switching over to conveying the non-voice wireless communications over a second wireless communication link between the user equipment and a second wireless base station, the second wireless base station disposed in the second wireless network, the second wireless base station supporting a second region of wireless coverage, the second region of wireless coverage being smaller than the first region of wireless coverage.

28. The method as in claim 27, wherein the second region of wireless coverage resides completely within the first region of wireless coverage.

29. The method as in claim 1, wherein operating the user equipment in the offload mode includes switching over of the connectivity from a first wireless base station in the first wireless network supporting a first region of wireless coverage to a second wireless base station in the second wireless network supporting a second region of wireless coverage, the second region of wireless coverage being smaller than the first region of wireless coverage.

30. The method as in claim 1, wherein operating the user equipment in the offload mode includes:
translating a carrier profile policy in the second subscriber identity information into the corresponding offload command.

31. The method as in claim 1, wherein operating the user equipment in the offload mode includes:
scanning for the second wireless network to handoff the connectivity from the first wireless network to the second wireless network.

32. The method as in claim 1 further comprising:
preventing display of a graphical user interface on the user equipment to select a network to handle the non-voice wireless communications.

33. A system comprising:
user equipment in which a first SIM storage entity and a second SIM storage entity are installed, the user equipment operable to:
access first subscriber identity information stored in the first SIM storage entity, the first subscriber identity information providing the user equipment access to a first wireless network in a network environment;
access second subscriber identity information stored in the second SIM storage entity, the second subscriber identity information providing the user equipment access to a second wireless network in the network environment;
via analysis of configuration settings in the second subscriber identity information: i) detect that the second network is assigned to support non-voice wireless communications between the user equipment and a remote network, and ii) detect an indication to operate the user equipment in an offload mode to support the non-voice wireless communications; and
in response to detecting the indication to operate in the offload mode to support the non-voice wireless communications, execute a corresponding offload command to operate the user equipment in the offload mode in which connectivity supporting the non-voice wireless communications is switched over from the first wireless network to the second wireless network.

34. The system as in claim 33, wherein the first wireless network is assigned to support voice communications between the user equipment and the remote network; and
wherein the user equipment is operable to establish a first wireless communication link with the first wireless network that supports the voice communications prior to establishing a second wireless communication link supporting the non-voice wireless communications.

35. The system as in claim 33, wherein the user equipment is further operable to:
in accordance with the first subscriber identity information, establish a first wireless communication link between the user equipment and the first wireless network, the established first wireless communication link supporting voice communications associated with the user equipment; and
communicate the non-voice wireless communications over the established first wireless communication link in accordance with the first subscriber identity information in response to detecting that the second wireless network is unavailable.

36. The system as in claim 33, wherein the first SIM storage entity is a first SIM device inserted into a first slot of the user equipment;
wherein the second SIM (Subscriber Identity Module) storage entity is a second SIM device inserted into a second slot of the user equipment; and
wherein the configuration settings of the second subscriber identity information indicating assignment of supporting the non-voice wireless communications are pre-programmed in the second SIM device prior to the second SIM device being inserted into the second slot of the user equipment.

37. The system as in claim 36, wherein an operating system of the user equipment is operable to access the pre-programmed configuration settings of the second subscriber identity information as an alternative to a user of the user equipment having to provide input specifying which of the first SIM device and the second SIM device present in the user equipment is to provide wireless service for the non-voice wireless communications.

38. The system as in claim 33, wherein an operating system of the user equipment is operable to:
- based on analysis of both the first subscriber identity information and the second subscriber identity information, verify that the first subscriber identity information supports voice communications between the user equipment and the first wireless network prior to establishing a wireless communication link between the user equipment and the second wireless network that communicates the non-voice wireless communications over the second wireless communication link.

39. The system as in claim 33, wherein the user equipment is operable to:
- switch between: i) receiving first communications at a modem device from the first wireless network, and ii) receiving second communications at the modem device from the second wireless network.

40. The system as in claim 39, wherein the user equipment is operable to process the first communications to determine whether a remote device is attempting to establish a voice call with the user equipment; and
- wherein the second communications are non-voice data communications retrieved by the user equipment.

41. The system as in claim 40, wherein the user equipment is operable to:
- in response to detecting occurrence of the remote device attempting to establish the voice call with the user equipment, and acceptance of the voice call by a user of the user equipment, control operation of the modem device to support communications between the user equipment and the remote device over the first wireless network in accordance with the first subscriber identity information.

42. The system as in claim 33, wherein the user equipment is operable to:
- switch from receiving the non-voice wireless communications from the first wireless network to receiving the non-voice wireless communications from the second wireless network depending on availability of the second wireless network, the second wireless network being a default network assigned a higher priority than the first wireless network over which to receive the non-voice wireless communications.

43. The system as in claim 33, wherein the user equipment is operable to:
- communicate from the user equipment to a wireless station in the first wireless network to determine availability of a wireless station in the second wireless network that supports the non-voice wireless communications.

44. Computer-readable storage hardware having instructions stored thereon, the instructions, when carried out by computer processor hardware, cause the computer processor hardware to:
- access first subscriber identity information stored in a first SIM storage entity, the first subscriber identity information assigned to user equipment, the first subscriber identity information providing the user equipment access to a first wireless network in a network environment;
- access second subscriber identity information stored in a second SIM storage entity, the second subscriber identity information assigned to the user equipment, the second subscriber identity information providing the user equipment access to a second wireless network in the network environment;
- via analysis of configuration settings in the second subscriber identity information: i) detect that the second network is assigned to support non-voice wireless communications between the user equipment and a remote network, and ii) detect an indication to operate the user equipment in an offload mode to support the non-voice wireless communications; and
- in response to detecting the indication to operate in the offload mode to support the non-voice wireless communications, executing a corresponding offload command to operate the user equipment in the offload mode in which connectivity supporting the non-voice wireless communications is switched over from the first wireless network to the second wireless network.

\* \* \* \* \*